United States Patent
Khoshnevisan et al.

(10) Patent No.: US 11,785,594 B2
(45) Date of Patent: Oct. 10, 2023

(54) MULTI-DOWNLINK CONTROL INFORMATION MESSAGE RELATED TO PHYSICAL UPLINK SHARED CHANNELS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/158,856

(22) Filed: Jan. 26, 2021

(65) Prior Publication Data

US 2021/0289525 A1 Sep. 16, 2021

Related U.S. Application Data

(60) Provisional application No. 62/990,217, filed on Mar. 16, 2020.

(51) Int. Cl.
*H04W 72/1268* (2023.01)
*H04W 72/23* (2023.01)
*H04L 1/1812* (2023.01)

(52) U.S. Cl.
CPC ....... *H04W 72/1268* (2013.01); *H04W 72/23* (2023.01); *H04L 1/1812* (2013.01)

(58) Field of Classification Search
None
See application file for complete search history.

(56) References Cited

U.S. PATENT DOCUMENTS

2020/0053717 A1\* 2/2020 Zhou .................... H04B 7/0695
2020/0119799 A1\* 4/2020 Jung .................... H04W 52/36
(Continued)

FOREIGN PATENT DOCUMENTS

CN 110536394 A \* 12/2019 .......... H04L 5/0053
CN 111092710 A \* 5/2020 .......... H04L 5/0053
(Continued)

OTHER PUBLICATIONS

Apple, 3GPP TSG RAN WG#100-e, "Remaining Issues for Multi-TRP Enhancement." Feb. 24, 2020. (Year: 2020).\*
(Continued)

*Primary Examiner* — Andrew C Oh
(74) *Attorney, Agent, or Firm* — Holland & Hart LLP

(57) ABSTRACT

Methods, systems, and devices for wireless communications are described. A communication device, otherwise known as a user equipment (UE) may receive, in a first control resource set (CORESET), a first downlink control information (DCI) message scheduling a first uplink shared channel, the first CORESET corresponding to a first CORESET pool index. The UE may receive, in a second CORESET, a second DCI message scheduling a second uplink shared channel, the second CORSET corresponding to a second CORESET pool index different from the first CORESET pool index, where the second DCI message may be received before transmission of the first uplink shared channel. The UE may transmit both the first uplink shared channel and the second uplink shared channel based on the first uplink shared channel and the second uplink shared channel corresponding to a same hybrid automatic repeat request (HARQ) process.

31 Claims, 17 Drawing Sheets

(56) References Cited

U.S. PATENT DOCUMENTS

| | | | | |
|---|---|---|---|---|
| 2020/0351798 A1* | 11/2020 | Ji | | H04W 52/10 |
| 2021/0044396 A1* | 2/2021 | Kakishima | | H04L 5/0023 |
| 2021/0058274 A1* | 2/2021 | Osawa | | H04B 7/0456 |
| 2021/0367655 A1* | 11/2021 | Jiang | | H04B 7/0404 |
| 2022/0330173 A1* | 10/2022 | Matsumura | | H04W 52/146 |
| 2022/0394499 A1* | 12/2022 | Matsumura | | H04W 72/04 |
| 2023/0041109 A1* | 2/2023 | Ling | | H04W 72/1268 |

FOREIGN PATENT DOCUMENTS

| | | | | |
|---|---|---|---|---|
| CN | 114175761 A * | 3/2022 | | H04L 5/0051 |
| EP | 4096332 A1 * | 11/2022 | | H04L 1/1812 |
| WO | WO-2020034442 A1 * | 2/2020 | | H04B 7/0617 |
| WO | WO-2020166081 A1 * | 8/2020 | | H04L 5/0023 |
| WO | WO-2020199956 A1 * | 10/2020 | | H04L 5/0053 |
| WO | WO-2021064926 A1 * | 4/2021 | | H04L 5/0051 |
| WO | WO-2021147001 A1 * | 7/2021 | | H04W 52/146 |
| WO | WO-2021155541 A1 * | 8/2021 | | H04L 5/0051 |
| WO | WO-2021179184 A1 * | 9/2021 | | H04L 5/0048 |
| WO | WO-2021181666 A1 * | 9/2021 | | H04L 1/1819 |

OTHER PUBLICATIONS

Apple Inc: "Remaining Issues for Multi-TRP Enhancement", 3GPP TSG RAN WG1 #100-e, 3GPP Draft; R1-2000859, e-Meeting, 3rd Generation Partnership Project (3GPP), Mobile Competence Centre; 650, Route Des Lucioles; F-06921 Sophia-Antipolis Cedex; France, vol. RAN WG1, No. e-Meeting; Feb. 24, 2020-Mar. 6, 2020, Feb. 15, 2020 (Feb. 15, 2020), 11 Pages, XP051853477, Retrieved from the Internet: URL: https://ftp.3gpp.org/tsg_ran/WG1_RL1/TSGR1_100_e/Docs/R1-2000859.zip R1-2000859 Remaining Issues for Multi-TRP Enhancemnt.docx [retrieved on Feb. 15, 2020] Section 1, section 2.2.

International Search Report and Written Opinion—PCT/US2021/015270—ISA/EPO—dated Jun. 8, 2021.

3rd Generation Partnership Project; Technical Specification Group Radio Access Network; NR; Physical layer procedures control (Release 16), 3GPP Standard; Technical Specification; 3GPP TS 38.213, 3rd Generation Partnership Project (3GPP), Mobile Competence Centre, 650, Route Des Lucioles, F-06921, Sophia-Antipolis Cedex, France, vol. RAN WG1, No. V16.0.0, (Dec. 2019), 146 pages, Jan. 14, 2020 (Jan. 14, 2020), XP051860806, Retrieved from the Internet: URL: http://ftp.3gpp.org/Specs/archive/38_series/38.213/38213-g00.zip 38213-g00.docx [retrieved on Jan. 14, 2020] Section 10.1; p. 100.

Partial International Search Report—PCT/US2021/015270—ISA/EPO—dated Mar. 31, 2021.

Sony: "L1 Enhancements on PUSCH for URLLC," 3GPP Draft, 3GPP TSG RAN WG1 Ad-Hoc Meeting 1901, R1-1900372—REL-16 URLLC—PUSCH V02, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593286, 5 pages, Retrieved from the Internet: URL: http://www.3gpp.org/ftp/Meetings%5F3GPP%5FSYNC/RAN1/Docs/R1%2D1900372%2Ezip [retrieved on Jan. 20, 2019] Section 2.3; figure 3.

VIVO: "Further Discussion on Multi-TRP/Panel Transmission", 3GPP Draft, 3GPP TSG RAN WG1 #97, R1-1906159_Further Discussion on Multi-TRP/Panel Transmission_Final, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 4, 2019 (May 4, 2019), XP051708200, 18 pages, Retrieved from the Internet: URL: http://www.3gpp.org/ftp/tsg%5Fran/WG1%5FRL1/TSGR1%5F97/Docs/R1%2D1906159%2Ezip. [retrieved on May 4, 2019], chapters 2. 3.1. 4.1.3. 5-7, Section 2.1. 3.1.

* cited by examiner

MULTI-DOWNLINK CONTROL INFORMATION MESSAGE RELATED TO PHYSICAL UPLINK SHARED CHANNELS

CROSS REFERENCE

The present Application for Patent claims the benefit of U.S. Provisional Patent Application No. 62/990,217 by KHOSHNEVISAN et al., entitled "MULTI-DOWNLINK CONTROL INFORMATION MESSAGE RELATED TO PHYSICAL UPLINK SHARED CHANNELS," filed Mar. 16, 2020, assigned to the assignee hereof, and expressly incorporated by reference herein.

FIELD OF TECHNOLOGY

The following relates generally to wireless communications and more specifically to multi-downlink control information (multi-DCI) message related to physical uplink shared channels (PUSCHs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipments (UEs). Some wireless communications systems may support directional communications using one or multiple directional beams. Some wireless communications systems may support directional communications to and from multiple transmission and reception points (TRPs). Some wireless communications systems may also support repetition of physical channels, such as a physical downlink shared channel (PDSCH), a PUSCH, etc. to improve reliability for directional communications to and from multiple TRPs. As demand for communication efficiency increases, it may be desirable to provide improvements to uplink directional communications to and from the multiple TRPs, among other examples.

SUMMARY

Various aspects of the described techniques relate to configuring a communication device, which may be otherwise known as a UE to support uplink communications to and from multiple TRPs. The UE may receive, from the multiple TRPs, downlink control information (DCI) messages scheduling various physical channels, such as a PUSCH, etc. The UE may be configured to distinguish between the multiple TRPs based in part on a control region, such as a control resource set (CORESET) in which a corresponding DCI message may be received from a corresponding TRP. The control region may, in some examples, include multiple CORESETs. Each CORESET may be associated with a value of a CORESET pool index, such as numerical value, for example zero ("0") or one ("1"). The UE may be configured to interpret various fields (e.g., control fields, data fields) in the received DCI messages from the multiple TRPs to support the uplink communications based on the multiple received DCI messages from the multiple TRPs. The described techniques may, as a result, include features for improvements to uplink communications and, in some examples, may promote enhanced efficiency for high reliability and low latency uplink operations in 5G systems, among other benefits.

A method of wireless communications at a UE is described. The method may include receiving, in a CORESET, a DCI message scheduling an uplink shared channel, the received DCI message including a sounding reference signal (SRS) resource indicator (SRI) field and transmitting, on the uplink shared channel, according to one or more uplink transmission parameters, the one or more uplink transmission parameters based at least in part on the SRI field in the received DCI message and a value of a CORESET pool index associated with the CORESET.

An apparatus for wireless communications is described. The apparatus may include a processor, memory coupled with the processor, and instructions stored in the memory. The instructions may be executable by the processor to cause the apparatus to receive, in a CORESET, a DCI message scheduling an uplink shared channel, the received DCI message including a SRI field and transmit, on the uplink shared channel, according to one or more uplink transmission parameters, the one or more uplink transmission parameters based at least in part on the SRI field in the received DCI message and a value of a CORESET pool index associated with the CORESET.

Another apparatus for wireless communications is described. The apparatus may include means for receiving, in a CORESET, a DCI message scheduling an uplink shared channel, the received DCI message including a SRI field and transmitting, on the uplink shared channel, according to one or more uplink transmission parameters, the one or more uplink transmission parameters based at least in part on the SRI field in the received DCI message and a value of a CORESET pool index associated with the CORESET.

A non-transitory computer-readable medium storing code for wireless communications at a UE is described. The code may include instructions executable by a processor to receive, in a CORESET, a DCI message scheduling an uplink shared channel, the received DCI message including a SRI field, and transmit, on the uplink shared channel, according to one or more uplink transmission parameters, the one or more uplink transmission parameters based at least in part on the SRI field in the received DCI message and a value of a CORESET pool index associated with the CORESET.

Some examples of the method, apparatuses, and non-transitory computer-readable medium described herein may further include operations, features, means, or instructions for determining an SRS resource set from at least two SRS resource sets to use for the uplink shared channel, the SRS resource set may be determined based on the value of the CORESET pool index.

In some examples of the method, apparatuses, and non-transitory computer-readable medium described herein, receiving, via a higher layer signaling, a configuration including a first association between a first value of the CORESET pool index and a first SRS resource set and a second association between a second value of the CORESET pool index and a second SRS resource set, where determining the SRS resource set from the at least two SRS resource sets includes: determining that the SRS resource set corresponds to the first SRS resource set based on the first value of the CORESET pool index or to the second SRS resource set based on the second value of the CORESET pool index.

Some examples of the method, apparatuses, and non-transitory computer-readable medium described herein may further include operations, features, means, or instructions for determining that one or both of the first SRS resource set and the second SRS resource set correspond to a codebook-based usage.

Some examples of the method, apparatuses, and non-transitory computer-readable medium described herein may further include operations, features, means, or instructions for determining that one or both of the first SRS resource set and the second SRS resource set correspond to a noncodebook-based usage.

In some examples of the method, apparatuses, and non-transitory computer-readable medium described herein, the higher layer signaling includes a radio resource control (RRC) signaling.

Some examples of the method, apparatuses, and non-transitory computer-readable medium described herein may further include operations, features, means, or instructions for identifying one or more SRS resources based on the SRI field in the received DCI message.

In some examples of the method, apparatuses, and non-transitory computer-readable medium described herein, the SRI field indicates that the one or more SRS resources correspond to a first SRS resource set based on the value of the CORESET pool index.

In some examples of the method, apparatuses, and non-transitory computer-readable medium described herein, the SRI field indicates that the one or more SRS resources correspond to a second SRS resource set based on the value of the CORESET pool index.

Some examples of the method, apparatuses, and non-transitory computer-readable medium described herein may further include operations, features, means, or instructions for determining the one or more uplink transmission parameters based on the one or more SRS resources, and where the one or more uplink transmission parameters includes a directional beam for the uplink shared channel, a precoding for the uplink shared channel, a rank for the uplink shared channel, or a power control parameter of the uplink shared channel, or a combination thereof.

Some examples of the method, apparatuses, and non-transitory computer-readable medium described herein may further include operations, features, means, or instructions for determining a transmission configuration indicator (TCI) state from a set of TCI states to use for the uplink shared channel based on the value of the CORESET pool index, where transmitting, on the uplink shared channel, includes, and transmitting, on the uplink shared channel, according to the determined TCI state.

Some examples of the method, apparatuses, and non-transitory computer-readable medium described herein may further include operations, features, means, or instructions for receiving, via a higher layer signaling, a configuration including a first association between a first value of the CORESET pool index and a first set of TCI states for the uplink shared channel and a second association between a second value of the CORESET pool index and a second set of TCI states for the uplink shared channel.

In some examples of the method, apparatuses, and non-transitory computer-readable medium described herein, the higher layer signaling includes an RRC signaling.

In some examples of the method, apparatuses, and non-transitory computer-readable medium described herein, the higher layer signaling includes a medium access control-control element (MAC-CE) signaling.

Some examples of the method, apparatuses, and non-transitory computer-readable medium described herein may further include operations, features, means, or instructions for identifying the TCI state to use for the uplink shared channel based on a TCI field in the received DCI message.

In some examples of the method, apparatuses, and non-transitory computer-readable medium described herein, the TCI field indicates that the TCI state corresponds to a first set of TCI states based on the value of the CORESET pool index.

In some examples of the method, apparatuses, and non-transitory computer-readable medium described herein, the TCI field indicates that the TCI state corresponds to a second set of TCI states based on the value of the CORESET pool index.

Some examples of the method, apparatuses, and non-transitory computer-readable medium described herein may further include operations, features, means, or instructions for receiving, via a higher layer signaling, a configuration including a first association between a first value of the CORESET pool index and a first list of one or more uplink shared channel power control parameters and a second association between a second value of the CORESET pool index and a second list of one or more uplink shared channel power control parameters.

Some examples of the method, apparatuses, and non-transitory computer-readable medium described herein may further include operations, features, means, or instructions for determining to use the first list of the one or more uplink shared channel power control parameters or the second list of the one or more uplink shared channel power control parameters based on identifying the value of the CORESET pool index associated with the CORESET.

In some examples of the method, apparatuses, and non-transitory computer-readable medium described herein, determining one or more uplink power control parameters based on the SRI field in the received DCI message pointing to an uplink shared channel power control index in the first list or the second list, where transmitting, on the uplink shared channel, includes: transmitting, on the uplink shared channel, according to the determined one or more uplink power control parameters.

In some examples of the method, apparatuses, and non-transitory computer-readable medium described herein, the one or more uplink power control parameters include a pathloss parameter corresponding to a reference signal power, a ratio for a pathloss compensation, an offset value, or a closed loop power control index, or a combination thereof.

Some examples of the method, apparatuses, and non-transitory computer-readable medium described herein may further include operations, features, means, or instructions for receiving, via a higher layer signaling, a configuration including a list of one or more uplink shared channel power control parameters.

Some examples of the method, apparatuses, and non-transitory computer-readable medium described herein may further include operations, features, means, or instructions for determining an uplink shared channel power control index associated with the list of the one or more uplink shared channel power control parameters based on a value of the SRI field in the received DCI message, the value of the CORESET pool index, and a number of SRI codepoints.

In some examples of the method, apparatuses, and non-transitory computer-readable medium described herein, a size of the list of the one or more uplink shared channel power control parameters may be larger than the number of SRI codepoints.

A method of wireless communications at a UE is described. The method may include receiving, in a first CORESET, a first DCI message scheduling a first uplink shared channel, the first CORESET corresponding to a first CORESET pool index, receiving, in a second CORESET, a second DCI message scheduling a second uplink shared channel, the second CORESET corresponding to a second CORESET pool index different from the first CORESET pool index, where the second DCI message is received before transmission of the first uplink shared channel, and transmitting both the first uplink shared channel and the second uplink shared channel based on the first uplink shared channel and the second uplink shared channel corresponding to a same hybrid automatic repeat request (HARQ) process.

An apparatus for wireless communications is described. The apparatus may include a processor, memory coupled with the processor, and instructions stored in the memory. The instructions may be executable by the processor to cause the apparatus to receive, in a first CORESET, a first DCI message scheduling a first uplink shared channel, the first CORESET corresponding to a first CORESET pool index, receive, in a second CORESET, a second DCI message scheduling a second uplink shared channel, the second CORESET corresponding to a second CORESET pool index different from the first CORESET pool index, where the second DCI message is received before transmission of the first uplink shared channel, and transmit both the first uplink shared channel and the second uplink shared channel based on the first uplink shared channel and the second uplink shared channel corresponding to a same HARQ process.

Another apparatus for wireless communications is described. The apparatus may include means for receiving, in a first CORESET, a first DCI message scheduling a first uplink shared channel, the first CORESET corresponding to a first CORESET pool index, receiving, in a second CORESET, a second DCI message scheduling a second uplink shared channel, the second CORESET corresponding to a second CORESET pool index different from the first CORESET pool index, where the second DCI message is received before transmission of the first uplink shared channel, and transmitting both the first uplink shared channel and the second uplink shared channel based on the first uplink shared channel and the second uplink shared channel corresponding to a same HARQ process.

A non-transitory computer-readable medium storing code for wireless communications at a UE is described. The code may include instructions executable by a processor to receive, in a first CORESET, a first DCI message scheduling a first uplink shared channel, the first CORESET corresponding to a first CORESET pool index, receive, in a second CORESET, a second DCI message scheduling a second uplink shared channel, the second CORESET corresponding to a second CORESET pool index different from the first CORESET pool index, where the second DCI message is received before transmission of the first uplink shared channel, and transmit both the first uplink shared channel and the second uplink shared channel based on the first uplink shared channel and the second uplink shared channel corresponding to a same HARQ process.

In some examples of the method, apparatuses, and non-transitory computer-readable medium described herein, one or both of the first DCI message includes a first new data indicator (NDI) and the second DCI message includes a second NDI, and a value of the first NDI in the first DCI message and a value of the second NDI in the second DCI message indicate a same value.

Some examples of the method, apparatuses, and non-transitory computer-readable medium described herein may further include operations, features, means, or instructions for determining a transport block for one or both of the first uplink shared channel and the second uplink shared channel, and where the first uplink shared channel and the second uplink shared channel correspond to a same transport block.

Some examples of the method, apparatuses, and non-transitory computer-readable medium described herein may further include operations, features, means, or instructions for determining a transport block size for one or both of the first uplink shared channel and the second uplink shared channel, and where the first uplink shared channel and the second uplink shared channel correspond to a same transport block size.

In some examples of the method, apparatuses, and non-transitory computer-readable medium described herein, a value of an uplink shared channel field in the first DCI message and a value of an uplink shared channel field in the second DCI message indicate a same value.

In some examples of the method, apparatuses, and non-transitory computer-readable medium described herein, a value of a code block group transmission indicator (CBGTI) field in the first DCI message and a value of a CBGTI field in the second DCI message indicate a same set of code block groups.

In some examples of the method, apparatuses, and non-transitory computer-readable medium described herein, the first uplink shared channel and the second uplink shared channel may be nonoverlapping in a time domain.

In some examples of the method, apparatuses, and non-transitory computer-readable medium described herein, a value of a priority indicator field in the first DCI message and a value of a priority indicator field in the second DCI message indicate a same priority.

Some examples of the method, apparatuses, and non-transitory computer-readable medium described herein may further include operations, features, means, or instructions for transmitting capability information to a base station, the capability information indicating a capability to jointly transmit the first uplink shared channel and the second uplink shared channel, and where the first DCI message and the second DCI message may be received in different CORESETs and correspond to different values of CORESET pool indices, and the second DCI message may be received before transmission of the first uplink shared channel.

A method of wireless communications at a base station is described. The method may include transmitting, in a CORESET associated with a set of CORESETs, a DCI message scheduling an uplink shared channel, the DCI message including an SRI field and receiving an uplink transmission associated with the uplink shared channel according to one or more uplink transmission parameters associated with the SRI field.

An apparatus for wireless communications is described. The apparatus may include a processor, memory coupled with the processor, and instructions stored in the memory. The instructions may be executable by the processor to cause the apparatus to transmit, in a CORESET associated with a set of CORESETs, a DCI message scheduling an uplink shared channel, the DCI message including a SRI field and receive an uplink transmission associated with the uplink shared channel according to one or more uplink transmission parameters associated with the SRI field.

Another apparatus for wireless communications is described. The apparatus may include means for transmitting, in a CORESET associated with a set of CORESETs, a DCI message scheduling an uplink shared channel, the DCI message including an SRI field and receiving an uplink transmission associated with the uplink shared channel according to one or more uplink transmission parameters associated with the SRI field.

A non-transitory computer-readable medium storing code for wireless communications at a base station is described. The code may include instructions executable by a processor to transmit, in a CORESET associated with a set of CORESETs, a DCI message scheduling an uplink shared channel, the DCI message including an SRI field and receive an uplink transmission associated with the uplink shared channel according to one or more uplink transmission parameters associated with the SRI field.

Some examples of the method, apparatuses, and non-transitory computer-readable medium described herein may further include operations, features, means, or instructions for receiving the uplink transmission may be further based on a SRS resource set determined from at least two SRS resource sets to use for the uplink shared channel based on a value of a CORESET pool index associated with the CORESET.

Some examples of the method, apparatuses, and non-transitory computer-readable medium described herein may further include operations, features, means, or instructions for transmitting, via a higher layer signaling, a configuration including a first association between a first value of the CORESET pool index and a first SRS resource set and a second association between a second value of the CORESET pool index and a second SRS resource set.

In some examples of the method, apparatuses, and non-transitory computer-readable medium described herein, one or both of the first SRS resource set and the second SRS resource set correspond to a codebook-based usage.

In some examples of the method, apparatuses, and non-transitory computer-readable medium described herein, one or both of the first SRS resource set and the second SRS resource set correspond to a noncodebook-based usage.

In some examples of the method, apparatuses, and non-transitory computer-readable medium described herein, the higher layer signaling includes an RRC signaling.

In some examples of the method, apparatuses, and non-transitory computer-readable medium described herein, the SRI field indicates that one or more SRS resources correspond to a first SRS resource set based on the value of the CORESET pool index.

In some examples of the method, apparatuses, and non-transitory computer-readable medium described herein, the SRI field indicates that one or more SRS resources correspond to a second SRS resource set based on the value of the CORESET pool index.

In some examples of the method, apparatuses, and non-transitory computer-readable medium described herein, the one or more uplink transmission parameters includes a directional beam for the uplink shared channel, a precoding for the uplink shared channel, a rank for the uplink shared channel, or a power control parameter of the uplink shared channel, or a combination thereof.

Some examples of the method, apparatuses, and non-transitory computer-readable medium described herein may further include operations, features, means, or instructions for transmitting, via a higher layer signaling, a configuration including a first association between a first value of the CORESET pool index and a first set of TCI states for the uplink shared channel and a second association between a second value of the CORESET pool index and a second set of TCI states for the uplink shared channel.

In some examples of the method, apparatuses, and non-transitory computer-readable medium described herein, a TCI field indicates that the TCI state corresponds to a first set of TCI states based on the value of the CORESET pool index.

In some examples of the method, apparatuses, and non-transitory computer-readable medium described herein, a TCI field indicates that the TCI state corresponds to a second set of TCI states based on the value of the CORESET pool index.

In some examples of the method, apparatuses, and non-transitory computer-readable medium described herein, the higher layer signaling includes an RRC signaling.

In some examples of the method, apparatuses, and non-transitory computer-readable medium described herein, the higher layer signaling includes a MAC-CE signaling.

Some examples of the method, apparatuses, and non-transitory computer-readable medium described herein may further include operations, features, means, or instructions for transmitting, via a higher layer signaling, a configuration including a first association between a first value of the CORESET pool index and a first list of one or more uplink shared channel power control parameters and a second association between a second value of the CORESET pool index and a second list of one or more uplink shared channel power control parameters.

In some examples of the method, apparatuses, and non-transitory computer-readable medium described herein, the one or more uplink power control parameter corresponds to the SRI field in the DCI message pointing to an uplink shared channel power control index in the first list or the second list.

In some examples of the method, apparatuses, and non-transitory computer-readable medium described herein, the one or more uplink power control parameters include a pathloss parameter corresponding to a reference signal power, a ratio for a pathloss compensation, an offset value, or a closed loop power control index, or a combination thereof.

Some examples of the method, apparatuses, and non-transitory computer-readable medium described herein may further include operations, features, means, or instructions for transmitting, via a higher layer signaling, a configuration including a list of one or more uplink shared channel power control parameters.

A method of wireless communications at a base station is described. The method may include transmitting, in a first CORESET, a first DCI message scheduling a first uplink shared channel, the first CORESET corresponding to a first CORESET pool index, transmitting, in a second CORESET, a second DCI message scheduling a second uplink shared channel, the second CORESET corresponding to a second CORESET pool index different from the first CORESET pool index, and receiving both the first uplink shared channel and the second uplink shared channel based on the first uplink shared channel and the second uplink shared channel corresponding to a same HARQ process, where the second DCI message is received before reception of the first uplink shared channel.

An apparatus for wireless communications is described. The apparatus may include a processor, memory coupled with the processor, and instructions stored in the memory. The instructions may be executable by the processor to cause the apparatus to transmit, in a first CORESET, a first DCI message scheduling a first uplink shared channel, the first CORESET corresponding to a first CORESET pool index, transmit, in a second CORESET, a second DCI message scheduling a second uplink shared channel, the second CORESET corresponding to a second CORESET pool index different from the first CORESET pool index, and receive both the first uplink shared channel and the second uplink shared channel based on the first uplink shared channel and the second uplink shared channel corresponding to a same HARQ process, where the second DCI message is received before reception of the first uplink shared channel.

Another apparatus for wireless communications is described. The apparatus may include means for transmitting, in a first CORESET, a first DCI message scheduling a first uplink shared channel, the first CORESET corresponding to a first CORESET pool index, transmitting, in a second CORESET, a second DCI message scheduling a second uplink shared channel, the second CORESET corresponding to a second CORESET pool index different from the first CORESET pool index, and receiving both the first uplink shared channel and the second uplink shared channel based on the first uplink shared channel and the second uplink shared channel corresponding to a same HARQ process, where the second DCI message is received before reception of the first uplink shared channel.

A non-transitory computer-readable medium storing code for wireless communications at a base station is described. The code may include instructions executable by a processor to transmit, in a first CORESET, a first DCI message scheduling a first uplink shared channel, the first CORESET corresponding to a first CORESET pool index, transmit, in a second CORESET, a second DCI message scheduling a second uplink shared channel, the second CORESET corresponding to a second CORESET pool index different from the first CORESET pool index, and receive both the first uplink shared channel and the second uplink shared channel based on the first uplink shared channel and the second uplink shared channel corresponding to a same HARQ process, where the second DCI message is received before reception of the first uplink shared channel.

In some examples of the method, apparatuses, and non-transitory computer-readable medium described herein, one or both of the first DCI message includes a first NDI and the second DCI message includes a second NDI, and a value of the first NDI in the first DCI message and a value of the second NDI in the second DCI message indicate a same value.

In some examples of the method, apparatuses, and non-transitory computer-readable medium described herein, the first uplink shared channel and the second uplink shared channel correspond to a same transport block.

In some examples of the method, apparatuses, and non-transitory computer-readable medium described herein, the first uplink shared channel and the second uplink shared channel correspond to a same transport block size.

In some examples of the method, apparatuses, and non-transitory computer-readable medium described herein, a value of an uplink shared channel field in the first DCI message and a value of an uplink shared channel field in the second DCI message indicate a same value.

In some examples of the method, apparatuses, and non-transitory computer-readable medium described herein, a value of a CBGTI field in the first DCI message and a value of a CBGTI field in the second DCI message indicate a same set of code block groups.

In some examples of the method, apparatuses, and non-transitory computer-readable medium described herein, the first uplink shared channel and the second uplink shared channel may be nonoverlapping in a time domain.

In some examples of the method, apparatuses, and non-transitory computer-readable medium described herein, a value of a priority indicator field in the first DCI message and a value of a priority indicator field in the second DCI message indicate a same priority.

Some examples of the method, apparatuses, and non-transitory computer-readable medium described herein may further include operations, features, means, or instructions for receiving capability information from a UE, the capability information indicating a capability for the UE to jointly transmit the first uplink shared channel and the second uplink shared channel, and where the first DCI message and the second DCI message may be received in different CORESET s and correspond to different values of CORESET pool indices, and the second DCI message may be received before reception of the first uplink shared channel.

DETAILED DESCRIPTION

Figure 1:
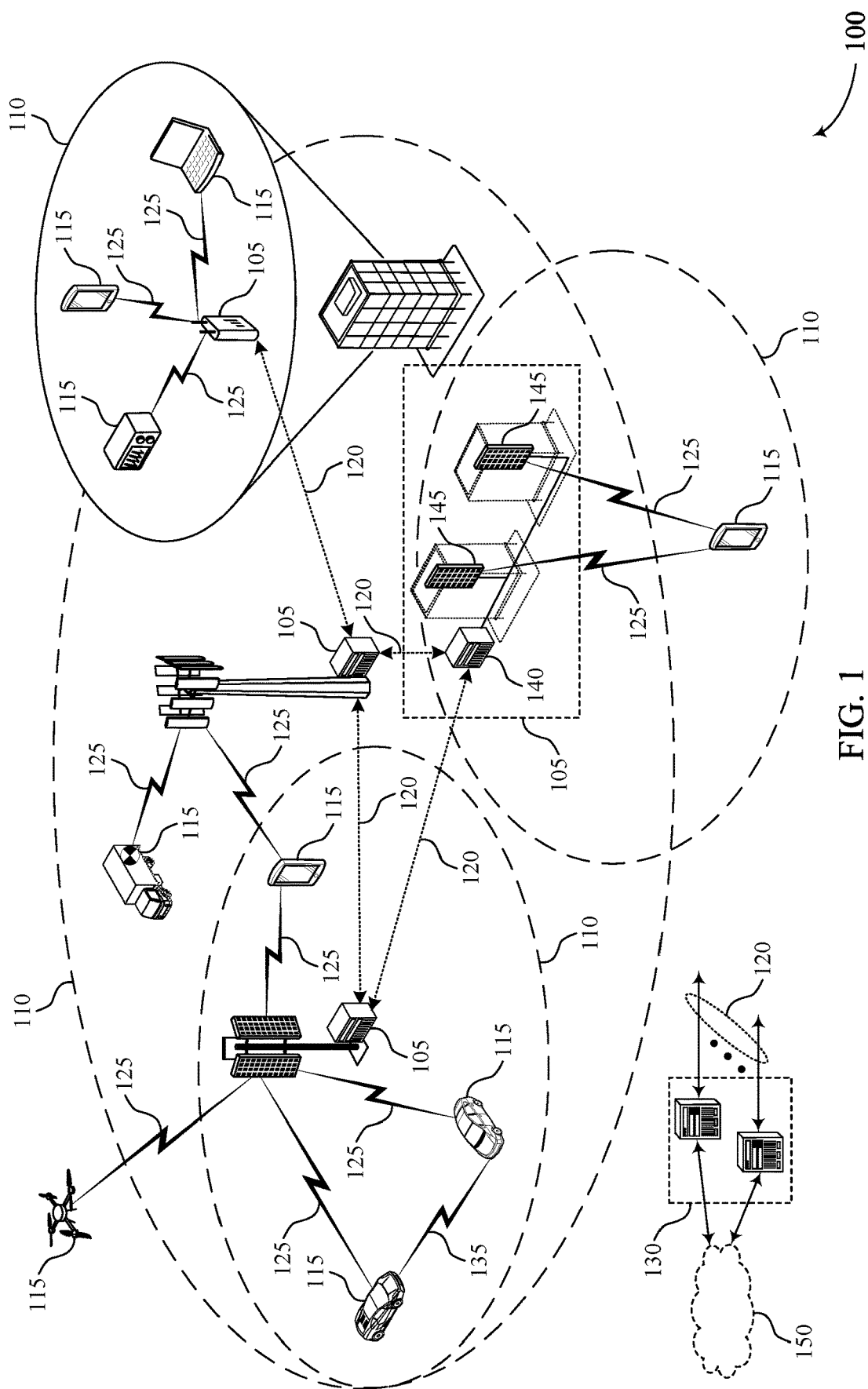
FIGS. 1 and 2 illustrate examples of wireless communications systems in accordance with aspects of the present disclosure.

Wireless communications systems may include multiple communication devices such as UEs and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as LTE systems, as well as fifth generation (5G) systems, which may be referred to as New Radio (NR) systems. The described techniques may be used to configure the UEs to support uplink directional communications using one or multiple directional beams. In some examples, the described techniques may be used to configure the UEs to support repetition of some physical uplink channels, such as a PUSCH, to improve reliability of the uplink directional communications (e.g., uplink control information, uplink data).

The wireless communications system may support directional communications to and from multiple TRPs. A UE may support downlink and uplink communications to and from the multiple TRPs. In some examples, the UE may receive, from the multiple TRPs, DCI messages scheduling various physical channels, such as a PUSCH, etc. The UE may thereby transmit on the physical channels various communications (e.g., control information, data) to the multiple TRPs based on information (e.g., an SRS resource sets, TCI states, uplink control power parameters, among other examples) provided in the DCI messages. The UE may be configured to distinguish between the multiple TRPs based in part on a control region, such as a CORESET in which a corresponding DCI message is received from a corresponding TRP. The control region may, in some examples, include multiple CORESETs. Each CORESET may be associated with a value of a CORESET pool index, such as numerical value, for example zero ("0") or one ("1").

The UE may be configured to interpret various fields (e.g., control fields, data fields) in the received DCI messages from the multiple TRPs to support uplink transmissions based on the multiple received DCI messages from the multiple TRPs. In some examples, the UE may be configured (e.g., via RRC configuration) with at least two SRS resource sets. One SRS resource set of the at least two SRS resource sets may be configured for a CORESET pool index value of 0, while the other SRS resource set of the at least two SRS resource sets may be configured for a CORESET pool index value of 1. The UE may interpret various fields (e.g., control fields, data fields) in the received DCI messages based on the CORESET pool index values.

For example, if the UE receives a DCI message in a CORESET with a CORESET pool index value 0, an SRS resource indicator (SRI) field of the DCI message may indicate one or more SRS resources within one of the SRS resource sets. Alternatively, if the UE receives a DCI message in a CORESET with a CORESET pool index value 1, an SRI field of the DCI message may indicate one or more SRS resources within the other SRS resource set. In some examples, the UE may be configured (e.g., via RRC configuration or activated through MAC-CE) with two or more different TCI states associated with two values of CORESET pool indices. As such, when the UE receives a DCI message in a CORESET configured with a value of CORESET pool index value, a TCI field may indicate a TCI state to use for an uplink transmission (e.g., a PUSCH) from the corresponding set of TCI states. In some other examples, the UE may be configured with one or multiple lists of uplink power control parameters. Similarly, the lists of uplink power control parameters may be configured for a value of the CORESET pool indices. The UE may thus handle uplink communications in accordance with the multiple DCI messages received from multiple TRPs.

Particular aspects of the subject matter described in this disclosure may be implemented to realize one or more of the following potential improvements, among others. The techniques employed by the UE may provide benefits and enhancements to the operation of the UE. For example, operations performed by the UE may provide improvements to communications when operating in 5G systems. In some examples, configuring the UE to support multi-DCI messaging related to PUSCHs, among other examples in 5G systems, may support improvements in power consumption, resource usage, coverage enhancements, spectral efficiency, higher data rates, among other benefits.

Aspects of the disclosure are initially described in the context of wireless communications systems. Aspects of the disclosure are further illustrated by and described with reference to apparatus diagrams, system diagrams, and flowcharts.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A UE 115 may support downlink and uplink communications to and from multiple TRPs. In some examples, the UE 115 may receive, from the multiple TRPs, DCI messages scheduling various physical channels, such as a PUSCH, etc. The UE 115 may thereby transmit on the physical channels various communications (e.g., control information, data) to the multiple TRPs based on information (e.g., an SRS resource sets, TCI states, uplink control power parameters, among other examples) provided in the DCI messages. The UE 115 may be configured to distinguish between the multiple TRPs based in part on a control region, such as a CORESET in which a corresponding DCI message is received from a corresponding TRP. The control region may, in some examples, include multiple CORESETs. Each CORESET may be associated with a value of a CORESET pool index, such as numerical value, for example zero ("0") or one ("1").

The UE 115 may be configured to interpret various fields (e.g., control fields, data fields) in the received DCI messages from the multiple TRPs to support uplink transmissions based on the multiple received DCI messages from the multiple TRPs. In some examples, the UE 115 may be configured (e.g., via RRC configuration) with at least two SRS resource sets. One SRS resource set of the at least two SRS resource sets may be configured for a CORESET pool index value of 0, while the other SRS resource set of the at least two SRS resource sets may be configured for a CORESET pool index value of 1. The UE 115 may interpret various fields (e.g., control fields, data fields) in the received DCI messages based on the CORESET pool index values.

For example, if the UE 115 receives a DCI message in a CORESET with a CORESET pool index value 0, an SRI field of the DCI message may indicate one or more SRS resources within one of the SRS resource set. Alternatively, if the UE 115 receives a DCI message in a CORESET with a CORESET pool index value 1, an SRI field of the DCI message may indicate one or more SRS resources within the other SRS resource set. In some examples, the UE 115 may be configured (e.g., via RRC configuration or activated through MAC-CE) with two or more different TCI states associated with two values of CORESET pool indices. As such, when the UE 115 receives a DCI message in a CORESET configured with a value of CORESET pool index value, a TCI field may indicate a TCI state to use for an uplink transmission (e.g., a PUSCH) from the corresponding set of TCI states. In some other examples, the UE 115 may be configured with one or multiple lists of uplink power control parameters. Similarly, the lists of uplink power control parameters may be configured for a value of the CORESET pool indices. The UE 115 may thus handle uplink communications in accordance with the multiple DCI messages received from multiple TRPs.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
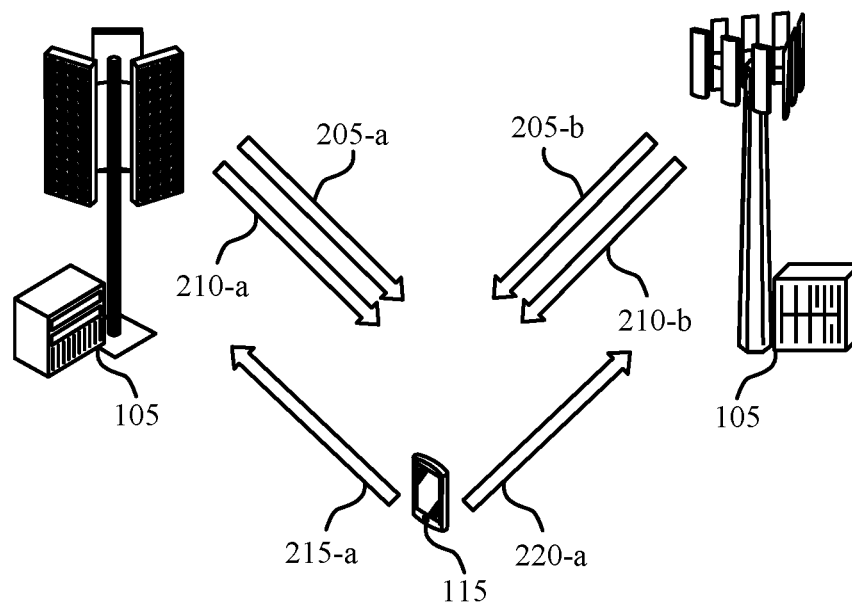

FIG. 2 illustrates an example of a wireless communications system 200 in accordance with aspects of the present disclosure. In some examples, the wireless communications system 200 may implement aspects of the wireless communications system 100. For example, the wireless communications system 200 may include multiple TRPs 105, which may be examples of the corresponding devices described with reference to FIG. 1, such as a base station 105. The wireless communications system 200 may also include a UE 115, which may be examples of the corresponding devices described with reference to FIG. 1. The wireless communications system 200 may support multiple radio access technologies including 4G systems such as LTE systems, LTE-A systems, or LTE-A Pro systems, 5G systems, which may be referred to as NR systems. The wireless communications system 200 may also support improvements in power consumption and, in some examples, may promote enhanced efficiency for high reliability and low latency directional uplink communications, among other benefits.

The TRPs 105 and the UE 115 may be configured with multiple antennas, which may be used to employ techniques such as transmit diversity, receive diversity, MIMO communications, or beamforming, or any combination thereof. The antennas of the TRPs 105 and the UE 115 may be located within one or more antenna arrays or antenna panels, which may support MIMO operations or transmit or receive beamforming. For example, the antennas or antenna arrays associated with the TRPs 105 may be co-located at an antenna assembly, such as an antenna tower. In some examples, antennas or antenna arrays associated with the TRPs 105 may be located in diverse geographic locations. The TRPs 105 may have an antenna array with a number of rows and columns of antenna ports that the TRPs 105 may use to support beamforming of directional communications with the UE 115. Likewise, the UE 115 may have one or more antenna arrays that may support various MIMO or beamforming operations. Additionally or alternatively, an antenna panel may support radio frequency beamforming for a signal transmitted via one or more antenna ports. The TRPs 105 and the UE 115 may thus be configured to support directional communications using the multiple antennas.

The UE 115, in the wireless communications system 200, may support operations to preserve resources (for example, time and frequency resources of the wireless communications system 200), a battery life of the UE 115, among other examples. In some examples, the UE 115 may be configured to support operations to manage or improve the directional communications between the multiple TRPs 105. For example, the wireless communications system 200 may support a multi-DCI messaging-based architecture for a multiple TRP communications. In some examples, the UE 115 may be configured, via higher layer signaling, such as RRC signaling or MAC-CE signaling to support the multi-DCI messaging-based architecture for multiple TRP communications. The UE 115 may be configured via a higher layer parameter (e.g., a physical downlink control channel (PDCCH)-Config parameter), which may include various values for a CORESET pool index for an active BWP of a serving cell. For example, the higher layer parameter may configure a value among at least two different values for a CORESET pool index for one or multiple CORESETs.

In the example of FIG. 2, a TRP 105 may transmit, to the UE 115, a DCI message on a PDCCH 205-a, where the DCI message schedules a PDSCH 210-a. Similarly, a TRP 105 may transmit, to the UE 115, a DCI message on a PDCCH 205-b, where the DCI message schedules a PDSCH 210-b. A corresponding DCI message transmitted from the TRP 105 schedules a corresponding PDSCH transmitted from the TRP 105. The DCI messages may be a DCI message corresponding to a specific DCI format. In some examples, the DCI messages may correspond to a DCI format 1-0 scheduling a PDSCH. In some other examples, the DCI messages may correspond to a DCI format 1-1 scheduling a PDSCH. In other examples, the DCI messages may correspond to a DCI format 1-2 scheduling a PDSCH.

The UE 115 may be configured to differentiate between the multiple TRPs 105 based in part on a value of a CORESET pool index, which may correspond to a CORESET in which a corresponding DCI message is received. For example, the UE 115 may receive, from each TRP 105, a corresponding PDCCH 205 carrying a corresponding DCI message in a control region for the corresponding PDCCH 205. The control region (e.g., a CORESET) for a PDCCH 205 may be defined over one or both of a number of time domain resources (e.g., symbol periods, minislots, or slots) and a number of frequency domain resources (e.g., subcarriers, carriers). The UE 115 may be configured with a maximum number of CORESETs, for example, such as five CORESETs. Each CORESET may be configured with a value of a CORESET pool index. The value of the CORESET pool index may be numerical value, such as zero ("0") or one ("1"). Each CORESET may be configured to a group based in part on a value of a CORSET pool index of each corresponding CORESET. Examples of CORESET pool indices is described in more detail with reference to FIG. 3.

Figure 3:
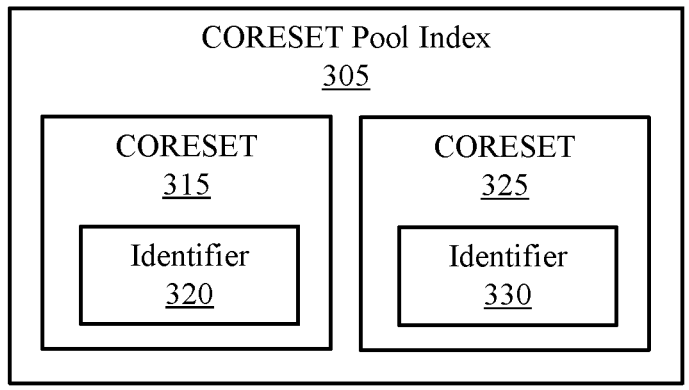
FIG. 3 illustrates an example of a CORESET pool indices in accordance with aspects of the present disclosure.
Figure 3:
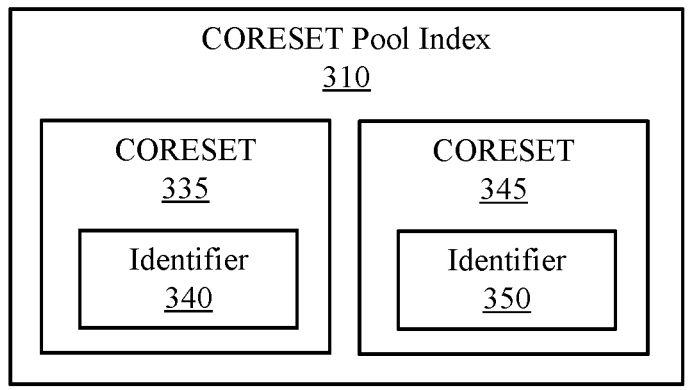

FIG. 3 illustrates an example of CORESET pool indices 300 in accordance with aspects of the present disclosure. The CORESET pool indices 300 may implement aspects of the wireless communications systems 100 and 200 described with reference to FIGS. 1 and 2, respectively. For example, the CORESET pool indices 300 may be based on a configuration by a base station 105, and implemented by a UE 115, which may be examples of the corresponding devices described with reference to FIGS. 1 and 2. In the example of FIG. 3, two or more CORESETs may be grouped into at least two CORESET groups.

Each CORESET may be configured with a value of a CORESET pool index. The value of the CORESET pool index may have a numerical value, such as a binary value of 0 or 1. The CORESET pool indices 300 may include a CORESET pool index 305, which may be configured to have a binary value of 0 (e.g., CORESET pool index=0). The CORESET pool indices 300 may include a CORESET pool index 310, which may be configured to have a binary value of 1 (e.g., CORESET pool index=1). Each CORESET may relate (e.g., be assigned) to a group (e.g., the CORESET pool index 305 or the CORESET pool index 310) based in part on a value of a CORESET pool index of each corresponding CORESET.

In some examples, the CORESET pool index 305 may include a CORESET 315 that may be associated with an identifier 320 (e.g., CORESET ID=1), as well as include a CORESET 325 that may be associated with an identifier 330 (e.g., CORESET ID=2). Each value of a CORESET pool index associated with the CORESET 315 and the CORESET 325 may be a same value (e.g., CORESET pool index=0). In some examples, the CORESET pool index 310 may include a CORESET 335 that may be associated with an identifier 340 (e.g., CORESET ID=3), as well as include a CORESET 345 that may be associated with an identifier 350 (e.g., CORESET ID=4). Each value of a CORESET pool index associated with the CORESET 335 and the CORESET 345 may be a same value (e.g., CORESET pool index=1). Thus, CORESETs corresponding to a same value of a CORESET pool index may be grouped.

Returning to FIG. 2, in some examples, the UE 115 may be configured to provide HARQ information for scheduled physical downlink channels (e.g., PDSCH), in 5G systems. The UE 115 may be configured, in some examples, to generate a HARQ codebook (e.g., a HARQ-ACK codebook) for providing HARQ information for scheduled physical downlink channels. In some examples, the UE 115 may be configured to generate the HARQ codebook based in part on a value of a CORESET pool index related to a CORESET in which a DCI message is received. In some examples, the UE 115 may be configured to determine a scrambling for scheduled physical downlink and uplink channels based in part on a value of a CORESET pool index related to a CORESET in which a DCI message is received. The UE 115 may, in some examples, be configured to determine a rate matching for scheduled physical downlink and uplink channels based in part on a value of a CORESET pool index related to a CORESET in which a DCI message is received.

A value of a CORESET pool index may be configured for a DCI message having a specific DCI format (e.g., a DCI format 1-0, a DCI format 1-1, or a DCI format 1-2) that schedules a physical uplink channel (e.g., a PUSCH). The UE 115 may be configured to decode (e.g., interpret) values of one or more fields in a DCI message based in part on a value of a CORESET pool index of a CORESET in which the DCI message is received in. In some examples, the UE 115 may be configured to support transmitting multiple physical uplink channels, such as multiple PUSCH to improve reliability of uplink communications in the wireless communications system 200. For example, the UE 115 may be configured to transmit multiple PUSCHs (e.g., at least two PUSCHs) scheduled by multiple DCI messages (e.g., at least two DCI messages). The multiple DCI messages may correspond to different CORESETs with different values of CORESET pool indices. The multiple PUSCHs may, in some examples, correspond to a same transport block. Thus, in some examples, the UE 115 may be configured to transmit the same transport block in multiple PUSCHs that are scheduled by multiple DCI messages received in different CORESETs with different values of CORESET pool indices. The UE 115 be configured to support the above if the multiple DCI messages (e.g., the at least two DCI messages)

indicate one or both of a same HARQ process (e.g., a same HARQ process) with a same NDI.

Some wireless communications systems may be unable to support the above unless a subsequent DCI message is received after transmission of a PUSCH scheduled by an earlier DCI message. This, however, may result in increased latency in the wireless communications system 200. The UE 115, in other words, might not expect to transmit a subsequent PUSCH scheduled by a subsequent DCI message having a specific DCI format (e.g., a DCI format 0-0, a DCI format 0-1 or a DCI format 0-2) and scrambled by a cell radio network temporary identifier (C-RNTI) or a modulation coding scheme C-RNTI (MCS-C-RNTI) for a given HARQ process, until after an end of an expected transmission of a last PUSCH for that given HARQ process. This may be applicable for both cases when both PUSCHs have a same NDI (or a same TB), as long as HARQ identifiers are the same. Additionally or alternatively, this may be applicable for both cases when both PUSCH have a different NDI or a new transport block for a subsequent PUSCH, as long as HARQ identifiers are the same.

A DCI message may include various control fields, such as an SRS resource indicator (SRI) field, a TCI field (e.g., an UL TCI field for a scheduled PUSCH transmission), among other examples. The SRI field may convey various information to the UE 115. In some examples, the SRI field may indicate one or more SRS resources with an SRS resource set, which the UE 115 may use to determine one or more parameters for one or more scheduled PUSCHs. For a codebook-based PUSCH, a single SRS resource set may have a usage field set to "codebook." For a noncodebook-based PUSCH, a single SRS resource set may have a usage field set to "noncodebook." The SRI field may indicate one SRS resource within the SRS resource set. Based on the indicated SRS resource, the UE 115 may determine a directional beam (e.g., an uplink directional beam) or a precoding for one or more scheduled PUSCH.

In some examples, the UE 115 may be configured to decode (e.g., interpret) a TCI field in a DCI message that may indicate a TCI state (e.g., an uplink directional beam) to use for one or more scheduled PUSCH. Other control fields of the DCI message may include a precoding information and number of layers field. The UE 115 may determine a transmitted precoding matrix index (TPMI) for one or more scheduled PUSCHs based in part on the precoding information and number of layers field. Additionally, the UE 115 may determine a rank to use for one or more scheduled PUSCHs based in part on the precoding information and number of layers field. The UE 115 may be configured to determine a rank for the scheduled PUSCH based in part on a number of indicated SRS resources. In some examples, the UE 115 may be configured to determine a TPMI (e.g., to interpret the precoding information and number of layers field) for one or more scheduled PUSCHs based in part on the indicated SRS resources.

The UE 115 may, in some examples, be configured to determine one or more uplink shared channel power control parameters for uplink power control for one or more scheduled PUSCHs. In some examples, the UE 115 may be configured with a list of one or more uplink shared channel power control parameters for uplink power control for a scheduled PUSCH (e.g., a list of SRI-PUSCH power control parameters with each member of the list corresponding to an uplink shared channel power control index (e.g., sri-PUSCH-PowerControlId: 0, . . . , 15). The uplink shared channel power control index may be used as a codepoint of an SRI field in a DCI message. For example, if a value of an SRI field in a DCI message scheduling a PUSCH corresponds to a certain value, the UE 115 may be configured to use one or more uplink shared channel power control parameters that correspond to an uplink shared channel power control index in the list of one or more uplink shared channel power control parameters having the certain value (e.g., index value).

Various aspects of the described techniques relate to configuring the UE 115 to support multi-DCI messaging related to multiple PUSCH. The TRP 105 may transmit, to the UE 115, a DCI message on the PDCCH 205-a, where the DCI message schedules one or both of the PDSCH 210-a and a PUSCH 215-a. Similarly, the TRP 105 may transmit, to the UE 115, a DCI message on the PDCCH 205-b, where the DCI message schedules one or both of the PDSCH 210-b and a PUSCH 220-a. In some examples, the UE 115 may receive, from a TRP 105, in a CORESET, a DCI message scheduling the PUSCH 220-a. Additionally or alternatively, the UE 115 may receive, from a TRP 105, in a CORESET, a DCI message scheduling a PUSCH 220-b.

The UE 115 may be configured to determine an SRS resource set from at least two SRS resource sets to use for a scheduled PUSCH 220 based in part on a value of a CORESET pool index associated with the CORESET in which the DCI message is received that scheduled the PUSCH 220. In some examples, the UE 115 may receive, via a higher layer signaling, a configuration including a first association between a first value of a CORESET pool index (e.g., a CORESET pool index value 0) and a first SRS resource set and a second association between a second value of the CORESET pool index (e.g., a CORESET pool index value 1) and a second SRS resource set. The higher layer signaling may be RRC signaling. A first SRS resource set may be associated with a CORESET pool index value 0 and a second SRS resource set may be associated with a CORESET pool index value 1. As such, the UE 115 may be RRC configured with at least two SRS resource sets.

The UE 115 may be configured to decode (e.g., interpret) or determine which SRS resource set of the at least two SRS resource sets to use for the scheduled PUSCH. For example, if the UE 115 receives a DCI message in a CORESET with a CORESET pool index value 0, an SRI field of the DCI message may indicate one or more SRS resources within the first SRS resource set. Otherwise, if the UE 115 receives the DCI message in a CORESET with a CORESET pool index value 1, an SRI field of the DCI message may indicate one or more SRS resources within the second SRS resource set. The at least two SRS resource sets may also have a usage field set to "codebook" in case of a codebook-based usage (e.g., CB-based PUSCH). Alternatively, the at least two SRS resource sets may have a usage field set to "noncodebook" in case of a noncodebook-based usage (e.g., NCB-based PUSCH).

The UE 115 may be configured to decode (e.g., interpret) or determine a TCI state to use for the scheduled PUSCH based in part on a value of a CORESET pool index associated with a CORESET in which the DCI message is received. The UE 115 may receive, via a higher layer signaling, a configuration including a first association between a first value of the CORESET pool index (e.g., a CORESET pool index value 0) and a first set of TCI states for the scheduled PUSCH and a second association between a second value of the CORESET pool index (e.g., a CORESET pool index value 1) and a second set of TCI states for the scheduled PUSCH. The UE 115 may thus be configured with two different sets of TCI states associated with two different values of CORESET pool indices via RRC configured or activated through MAC-CE for the scheduled PUSCH. Thus, when the UE 115 receives the DCI message in a CORESET configured with a value of a CORESET pool index, the UE 115 may determine, via a TCI field, a TCI state to use for the scheduled PUSCH from a corresponding set of TCI states.

The UE 115 may be configured with one or multiple lists of one or more uplink shared channel power control parameters for uplink power control (e.g., a list of SRI-PUSCH power control parameters mapping for a scheduled PUSCH). In some examples, the UE 115 may be configured with at least two lists of uplink shared channel power control parameters, and each list may correspond to a specific value of a CORESET pool index. For example, when the UE 115 receives a DCI message in a CORESET configured with a value of CORESET pool index, an SRI field value may point to an uplink shared channel power control index (e.g., sri-PUSCH-PowerControlId) in a corresponding list of uplink shared channel power control parameters. The uplink shared channel power control index may identify one or more uplink shared channel power control parameters in the list for the UE 115 to use for the scheduled PUSCH. Example of power control parameters may include a pathloss reference signal, an offset value (also referred to as P0), a ratio for a pathloss compensation (also referred to as alpha), a closed loop power control index, among other examples.

In some other examples, the UE 115 may be configured with a single list of uplink shared channel power control parameters that may be a factor of a number of SRI codepoints. In other words, the UE 115 may be configured with a list that can have a number of members (e.g., uplink shared channel power control parameters) up to a factor (e.g., twice) of possible SRI codepoints. For example, if the UE 115 receives a DCI message in a CORESET with a CORESET pool index value 0, an SRI field in the received DCI message may be used by the UE 115 to determine an uplink shared channel power control index (e.g., a sri-PUSCH-PowerControlId). Otherwise, if the UE 115 receives a DCI message in a CORESET with a CORESET pool index value 1, the uplink shared channel power control index (e.g., an sri-PUSCH-PowerControlId) may be determined based in part on an SRI field in the received DCI message plus a number of SRI codepoints (i.e., SRI field value+max SRI field value+1). For example, an SRI field may have four bits: sri-PUSCH-PowerControlId is determined by SRI field value+16 for a DCI message in a CORESET with a CORESET pool index value 1.

The operations performed by the TRPs 105 and the UE 115, for example, may thus provide improvements to directional operations in the wireless communications system 200, as well as extend PUSCH coverage. Furthermore, the operations performed by the TRPs 105 and the UE 115 may provide benefits and enhancements to the operation of the UE 115. For example, by supporting multi-DCI messaging for PUSCH in the wireless communications system 200, various operational characteristics, such as power consumption, may be reduced. The operations performed by the TRPs 105 and the UE 115 may also promote efficiency of the UE 115 by reducing latency associated with processes related to high reliability and low latency directional communications, among other examples.

Figure 4:
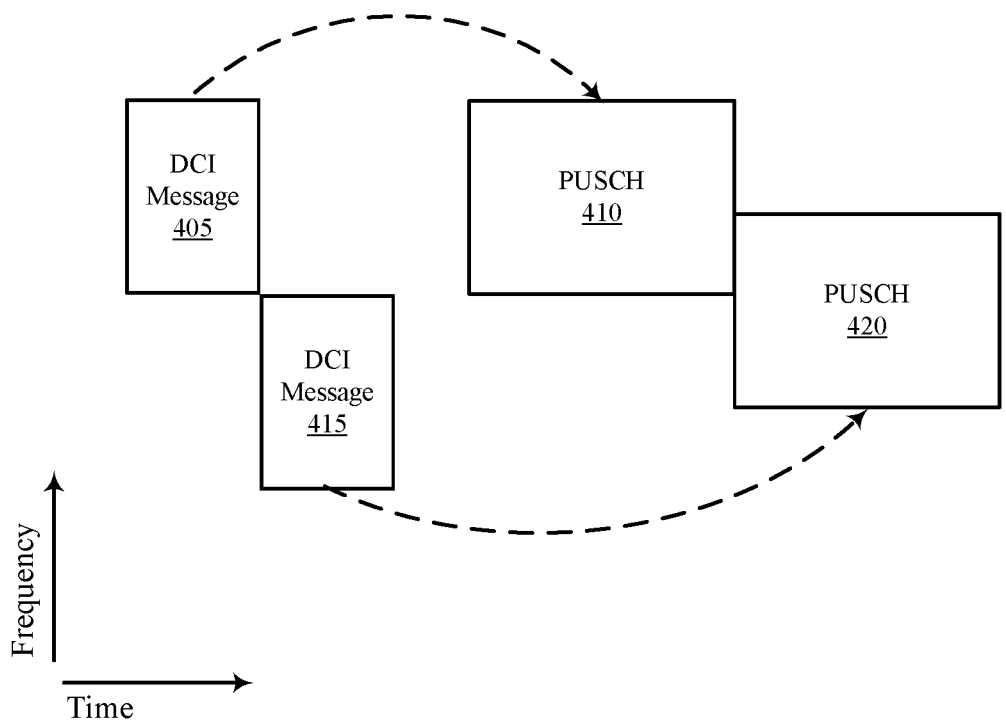
FIG. 4 illustrates an example of a transmission timeline in accordance with aspects of the present disclosure.

FIG. 4 illustrates an example of a transmission timeline 400 in accordance with aspects of the present disclosure. The transmission timeline 400 may implement aspects of the wireless communications systems 100 and 200 described with reference to FIGS. 1 and 2, respectively. For example, the transmission timeline 400 may be based on a configuration by a base station 105, and implemented by a UE 115, which may be examples of the corresponding devices described with reference to FIGS. 1 and 2. The transmission timeline 400 may support multiple radio access technologies including 4G systems such as LTE systems, LTE-A systems, or LTE-A Pro systems, 5G systems, which may be referred to as NR systems. The transmission timeline 400 may also support improvements in power consumption and, in some examples, may promote enhanced efficiency for high reliability and low latency uplink directional communications, among other benefits.

With reference to FIG. 4, a UE 115 may receive, in a first CORESET, a DCI message 405 scheduling a PUSCH 410. The first CORESET may correspond to a first CORESET pool index. The UE 115 may also receive, in a second CORESET, a DCI message 415 scheduling a PUSCH 420. The second CORESET may correspond to a second CORESET pool index different from the first CORESET pool index. The UE 115 may determine that the PUSCH 410 and the PUSCH 420 correspond to a same HARQ process (e.g., a HARQ-Ack process) based in part on a value of each of the first CORESET pool index and the second CORESET pool index. The UE 115 may transmit both the PUSCH 410 and the PUSCH 420 based in part on that the PUSCH 410 and the PUSCH 420 correspond to a same HARQ process.

Thus, if the UE 115 receives a first DCI message in a first CORESET with a CORESET pool index=0 scheduling a first PUSCH with a HARQ process, the UE 115 can receive a second DCI message before transmission of the first PUSCH scheduling a second PUSCH with the same HARQ process, and transmit both first and second PUSCHs based in part on one or more conditions. In some examples, the UE 115 may provide capability information. The capability information may indicate a capability for the UE 115 to transmit the PUSCH 410 and the PUSCH 420, which may be scheduled by different DCI messages received in different CORESETs corresponding to different values of CORESET pool indices based on the timeline described above. Thus, the UE capability can be conditioned on supporting CORESETs with different values of CORESET pool indices (i.e., supporting multi-DCI). The UE 115 may additionally indicate whether the UE 115 can support this or with one or more of the conditions as described herein (e.g., two PUSCH associated with different values of CORESET pool indices, transport blocks should be the same, or priorities should be the same, etc.).

The UE 115 may receive the DCI message 415, before transmission of the PUSCH 410, scheduling the PUSCH 420 with the same HARQ process, and transmit both the PUSCH 410 and the PUSCH 420 if the DCI message 415 is received in a CORESET with a CORESET pool index=1. As such, the UE 115 is not expected to be scheduled to transmit another PUSCH by a DCI format 0-0, 0-1 or 0-2, and scrambled by C-RNTI or MCS-C-RNTI for a given HARQ process until after an end of an expected transmission of a last PUSCH for that HARQ process if two PUSCHs are associated with a same value of CORESET pool index.

The UE 115 may receive the DCI message 415, before transmission of the PUSCH 410, scheduling the PUSCH 420 with the same HARQ process, and transmit both the PUSCH 410 and the PUSCH 420 if both the PUSCH 410 and the PUSCH 420 correspond to a same transport block and a same set of code block group in case of a code block group-based transmission. In some other examples, the UE 115 may receive the DCI message 415, before transmission of the PUSCH 410, scheduling the PUSCH 420 with the same HARQ process, and transmit both the PUSCH 410 and the PUSCH 420 if a value of an NDI field is the same in both the DCI message 405 and the DCI message 415. In other examples, the UE 115 may receive the DCI message 415, before transmission of the PUSCH 410, scheduling the PUSCH 420 with the same HARQ process, and transmit both the PUSCH 410 and the PUSCH 420 if a value of a UL-SCH field is the same (e.g., UL-SCH field is 1) in both the DCI message 405 and the DCI message 415.

In some examples, in case of code block group-based transmission when the UE 115 is configured with code block group transmission for PUSCH, a CBGTI field may indicate which code block groups to transmit for the scheduled PUSCH (e.g., for one or both of the PUSCH 410 and the PUSCH 420). The CBGTI field may indicate a same set of code block group to transmit for the scheduled PUSCH (e.g., for one or both of the PUSCH 410 and the PUSCH 420). The UE 115 may be configured to determine a transport block size for one or both of the PUSCH 410 and the PUSCH 420, and transmit both the PUSCH 410 and the PUSCH 420 if the transport block size is the same for both the PUSCH 410 and the PUSCH 420. The transport block size is determined as a function of scheduling info in a DCI message, such as modulation and coding scheme (MCS), a frequency domain resource assignment (FDRA), time domain resource assignment (TDRA), number of layers, etc.).

In some examples, the UE 115 may receive the DCI message 415, before transmission of the PUSCH 410, scheduling the PUSCH 420 with the same HARQ process, and transmit both the PUSCH 410 and the PUSCH 420 if both the PUSCH 410 and the PUSCH 420 are non-overlapping in a time domain. In some other examples, the UE 115 may receive the DCI message 415, before transmission of the PUSCH 410, scheduling the PUSCH 420 with the same HARQ process, and transmit both the PUSCH 410 and the PUSCH 420 if a priority indicator in the DCI message 405 and the DCI message 415 indicates a same priority for the PUSCH 410 and the PUSCH 420.

The operations performed by the UE 115, for example, may thus provide improvements to uplink directional communications in 5G systems, as well as extend PUSCH coverage. Furthermore, the operations performed by the UE 115 may provide benefits and enhancements to the operation of the UE 115. For example, by supporting multi-DCI messaging for PUSCH, various operational characteristics, such as power consumption, may be reduced. The operations performed by the UE 115 may also promote efficiency of the UE 115 by reducing latency associated with processes related to high reliability and low latency directional communications, among other examples.

Figure 5:
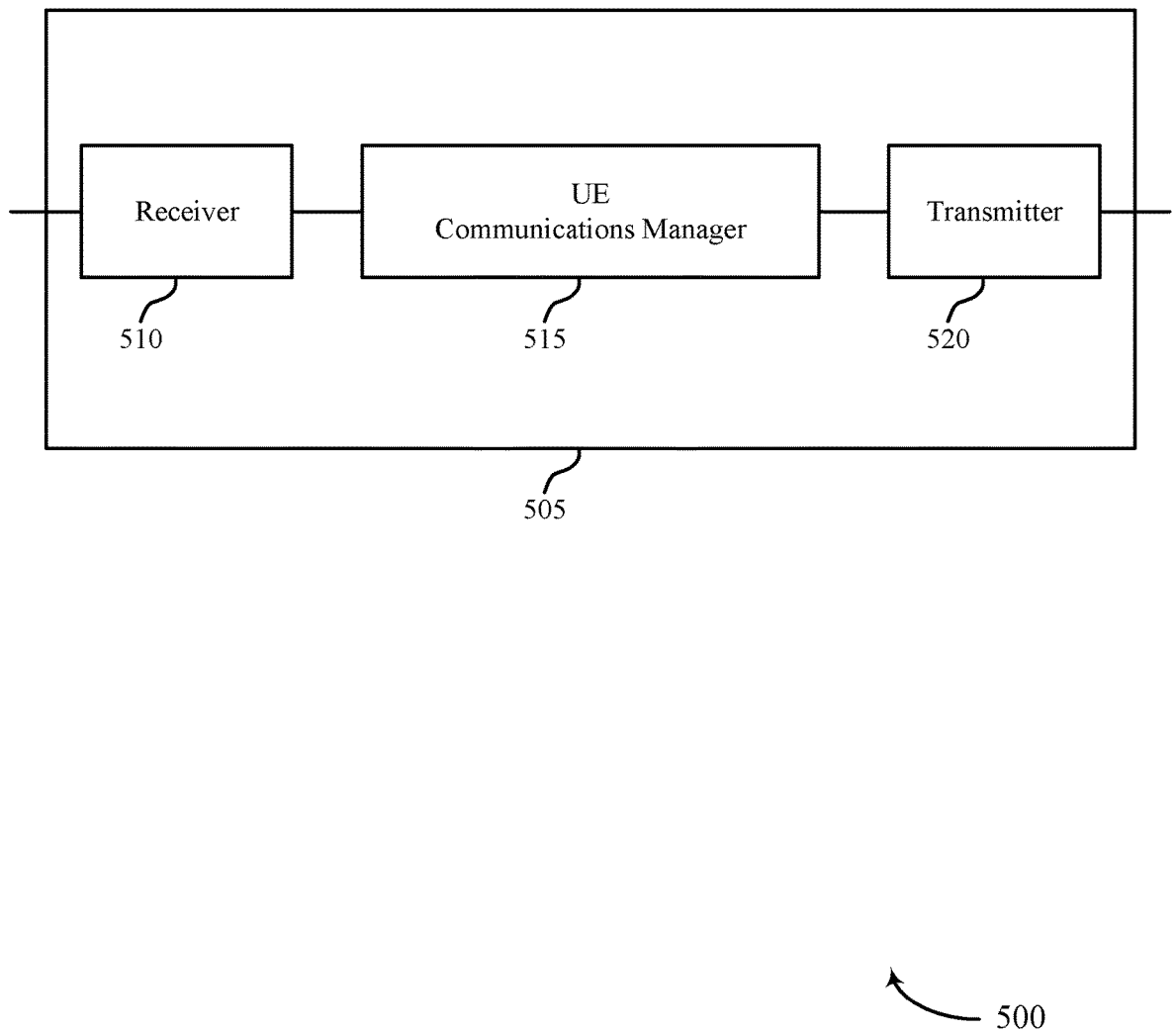
FIGS. 5 and 6 show diagrams of devices in accordance with aspects of the present disclosure.

FIG. 5 shows a diagram 500 of a device 505 in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multi-DCI message related to PUSCHs, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, in a CORESET, a DCI message scheduling an uplink shared channel, the received DCI message including a SRI field, and transmit, on the uplink shared channel, according to one or more uplink transmission parameters, the one or more uplink transmission parameters based at least in part on the SRI field in the received DCI message and a value of a CORESET pool index associated with the CORESET.

The UE communications manager 515 may also receive, in a first CORESET, a first DCI message scheduling a first uplink shared channel, the first CORESET corresponding to a first CORESET pool index, receive, in a second CORESET, a second DCI message scheduling a second uplink shared channel, the second CORESET corresponding to a second CORESET pool index different from the first CORESET pool index, where the second DCI message is received before transmission of the first uplink shared channel, and transmit both the first uplink shared channel and the second uplink shared channel based on the first uplink shared channel and the second uplink shared channel corresponding to a same HARQ process. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
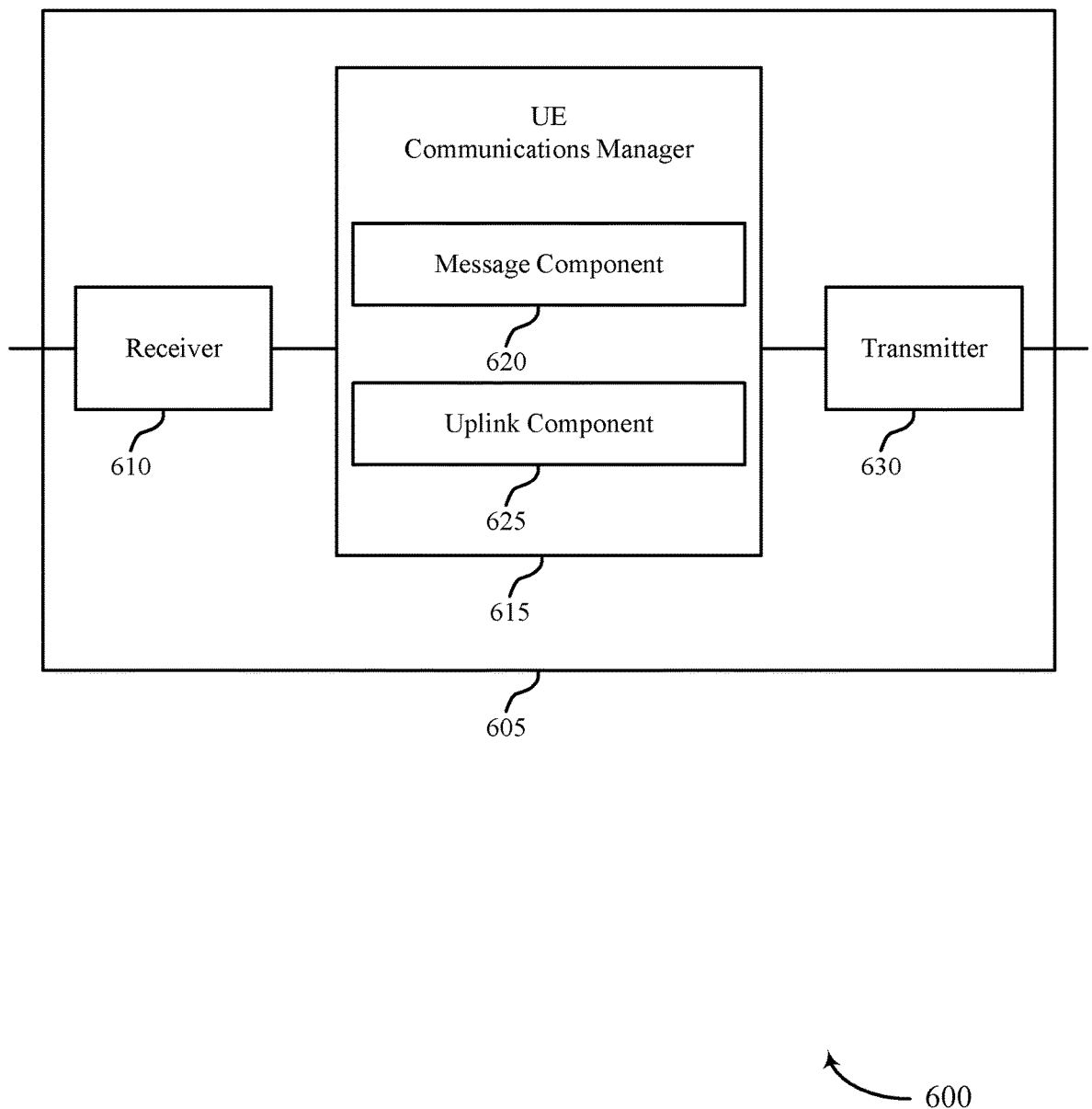

FIG. 6 shows a diagram 600 of a device 605 in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to multi-DCI message related to PUSCHs, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a message component 620 and an uplink component 625. The UE communications manager 615 may be an example of aspects of the UE communications manager 810 described herein.

The message component 620 may receive, in a CORESET, a DCI message scheduling an uplink shared channel, the received DCI message including an SRI field. The uplink component 625 may transmit, on the uplink shared channel, according to one or more uplink transmission parameters, the one or more uplink transmission parameters based at least in part on the SRI field in the received DCI message and a value of a CORESET pool index associated with the CORESET.

The message component 620 may receive, in a first CORESET, a first DCI message scheduling a first uplink shared channel, the first CORESET corresponding to a first CORESET pool index and receive, in a second CORESET, a second DCI message scheduling a second uplink shared channel, the second CORESET corresponding to a second CORESET pool index different from the first CORESET pool index, where the second DCI message is received before transmission of the first uplink shared channel. The uplink component 625 may transmit both the first uplink shared channel and the second uplink shared channel based on the first uplink shared channel and the second uplink shared channel corresponding to a same HARQ process.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
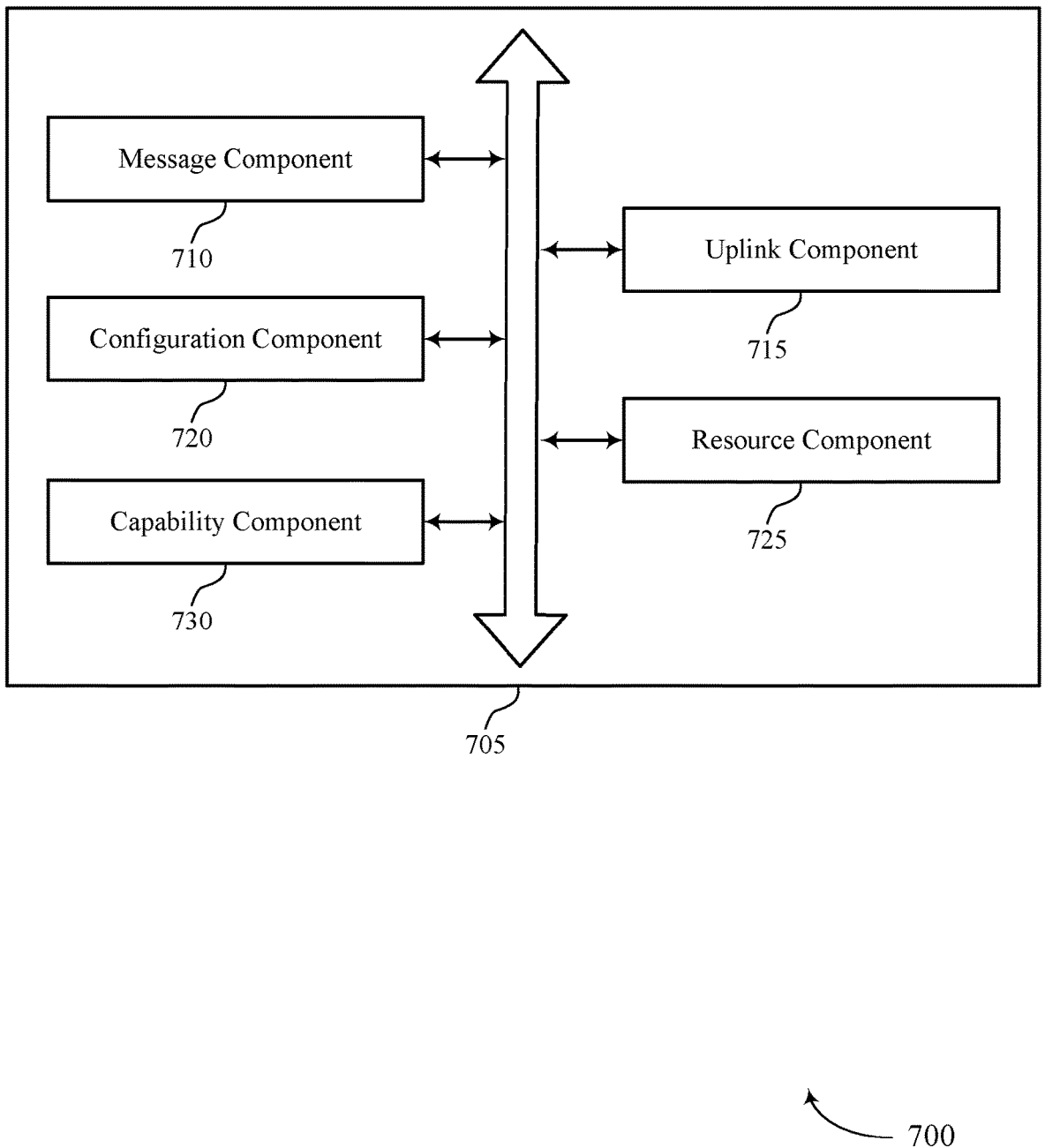
FIG. 7 shows a diagram of a UE communications manager in accordance with aspects of the present disclosure.

FIG. 7 shows a diagram 700 of a UE communications manager 705 in accordance with aspects of the present disclosure. The UE communications manager 705 may be an example of aspects of a UE communications manager 515, a UE communications manager 615, or a UE communications manager 810 described herein. The UE communications manager 705 may include a message component 710, an uplink component 715, a configuration component 720, a resource component 725, and a capability component 730. Each of these components may communicate, directly or indirectly, with one another (e.g., via one or more buses).

The message component 710 may receive, in a CORESET, a DCI message scheduling an uplink shared channel, the received DCI message including an SRI field. In some examples, the message component 710 may receive, in a first CORESET, a first DCI message scheduling a first uplink shared channel, the first CORESET corresponding to a first CORESET pool index. In some examples, the message component 710 may receive, in a second CORESET, a second DCI message scheduling a second uplink shared channel, the second CORESET corresponding to a second CORESET pool index different from the first CORESET pool index, where the second DCI message is received before transmission of the first uplink shared channel. In some cases, one or both of the first DCI message includes a first NDI and the second DCI message includes a second NDI, and a value of the first NDI in the first DCI message and a value of the second NDI in the second DCI message indicate a same value.

In some examples, the configuration component 720 may determine a SRS resource set from at least two SRS resource sets to use for the uplink shared channel, the SRS resource set is determined based on the value of the CORESET pool index.

The uplink component 715 may transmit, on the uplink shared channel, according to one or more uplink transmission parameters, the one or more uplink transmission parameters based at least in part on the SRI field in the received DCI message and a value of a CORESET pool index associated with the CORESET. In some examples, the uplink component 715 may determine an SRS resource set from at least two SRS resource sets to use for the uplink shared channel, the SRS resource set is determined based on the value of the CORESET pool index. In some examples, the uplink component 715 may transmit both the first uplink shared channel and the second uplink shared channel based on the first uplink shared channel and the second uplink shared channel correspond to a same HARQ process. In some examples, the uplink component 715 may determine a transport block for one or both of the first uplink shared channel and the second uplink shared channel, where the first uplink shared channel and the second uplink shared channel correspond to a same transport block. In some examples, the uplink component 715 may determine a transport block size for one or both of the first uplink shared channel and the second uplink shared channel, where the first uplink shared channel and the second uplink shared channel correspond to a same transport block size.

In some cases, a value of an uplink shared channel field in the first DCI message and a value of an uplink shared channel field in the second DCI message indicate a same value. In some cases, a value of a CBGTI field in the first DCI message and a value of a CBGTI field in the second DCI message indicate a same set of code block groups. In some cases, the first uplink shared channel and the second uplink shared channel are nonoverlapping in a time domain. In some cases, a value of a priority indicator field in the first DCI message and a value of a priority indicator field in the second DCI message indicate a same priority.

The configuration component 720 may determine that one or both of the first SRS resource set and the second SRS resource set correspond to a codebook-based usage. In some examples, the configuration component 720 may determine that one or both of the first SRS resource set and the second SRS resource set correspond to a noncodebook-based usage. In some examples, determining a TCI state from a set of TCI states to use for the uplink shared channel based on the value of the CORESET pool index, where transmitting, on the uplink shared channel, includes. In some examples, the configuration component 720 may transmit, on the uplink shared channel, according to the determined TCI state.

In some examples, the configuration component 720 may receive, via a higher layer signaling, a configuration including a first association between a first value of the CORESET pool index and a first set of TCI states for the uplink shared channel and a second association between a second value of the CORESET pool index and a second set of TCI states for the uplink shared channel. In some examples, the configuration component 720 may identify the TCI state to use for the uplink shared channel based on a TCI field in the received DCI message. In some examples, the configuration component 720 may receive, via a higher layer signaling, a configuration including a first association between a first value of the CORESET pool index and a first list of one or more uplink shared channel power control parameters and a second association between a second value of the CORE-SET pool index and a second list of one or more uplink shared channel power control parameters. In some examples, the configuration component 720 may determine to use the first list of the one or more uplink shared channel power control parameters or the second list of the one or more uplink shared channel power control parameters based on identifying the value of the CORESET pool index associated with the CORESET.

In some examples, the configuration component 720 may receive, via a higher layer signaling, a configuration including a list of one or more uplink shared channel power control parameters. In some examples, the configuration component 720 may determine an uplink shared channel power control index associated with the list of the one or more uplink shared channel power control parameters based on a value of the SRI field in the received DCI message, the value of the CORESET pool index, and a number of SRI codepoints. In some cases, receiving, via a higher layer signaling, a configuration including a first association between a first value of the CORESET pool index and a first SRS resource set and a second association between a second value of the CORE-SET pool index and a second SRS resource set, where determining the SRS resource set from the at least two SRS resource sets includes: determining that the SRS resource set corresponds to the first SRS resource set based on the first value of the CORESET pool index or to the second SRS resource set based on the second value of the CORESET pool index. In some cases, the higher layer signaling includes an RRC signaling. In some cases, the higher layer signaling includes a MAC-CE signaling.

In some cases, the TCI field indicates that the TCI state corresponds to a first set of TCI states based on the value of the CORESET pool index. In some cases, the TCI field indicates that the TCI state corresponds to a second set of TCI states based on the value of the CORESET pool index. In some cases, the configuration component 720 may determine one or more uplink power control parameters based on the SRI field in the received DCI message pointing to an uplink shared channel power control index in the first list or the second list, where transmitting, on the uplink shared channel, includes: transmitting, on the uplink shared channel, according to the determined one or more uplink power control parameters. In some cases, the one or more uplink power control parameters include a pathloss parameter corresponding to a reference signal power, a ratio for a pathloss compensation, an offset value, or a closed loop power control index, or a combination thereof. In some cases, a size of the list of the one or more uplink shared channel power control parameters is larger than the number of SRI codepoints.

The resource component 725 may identify one or more SRS resources based on the SRI field in the received DCI message. In some examples, the resource component 725 may determine the one or more uplink transmission parameters based on the one or more SRS resources, where the one or more uplink transmission parameters includes a directional beam for the uplink shared channel, a precoding for the uplink shared channel, a rank for the uplink shared channel, or a power control parameter of the uplink shared channel, or a combination thereof. In some cases, the SRI field indicates that the one or more SRS resources correspond to a first SRS resource set based on the value of the CORESET pool index. In some cases, the SRI field indicates that the one or more SRS resources correspond to a second SRS resource set based on the value of the CORESET pool index.

The capability component 730 may transmit capability information to a base station, the capability information indicating a capability to jointly transmit the first uplink shared channel and the second uplink shared channel, where the first DCI message and the second DCI message are received in different CORESETs and correspond to different values of CORESET pool indices, and the second DCI message is received before transmission of the first uplink shared channel.

Figure 8:
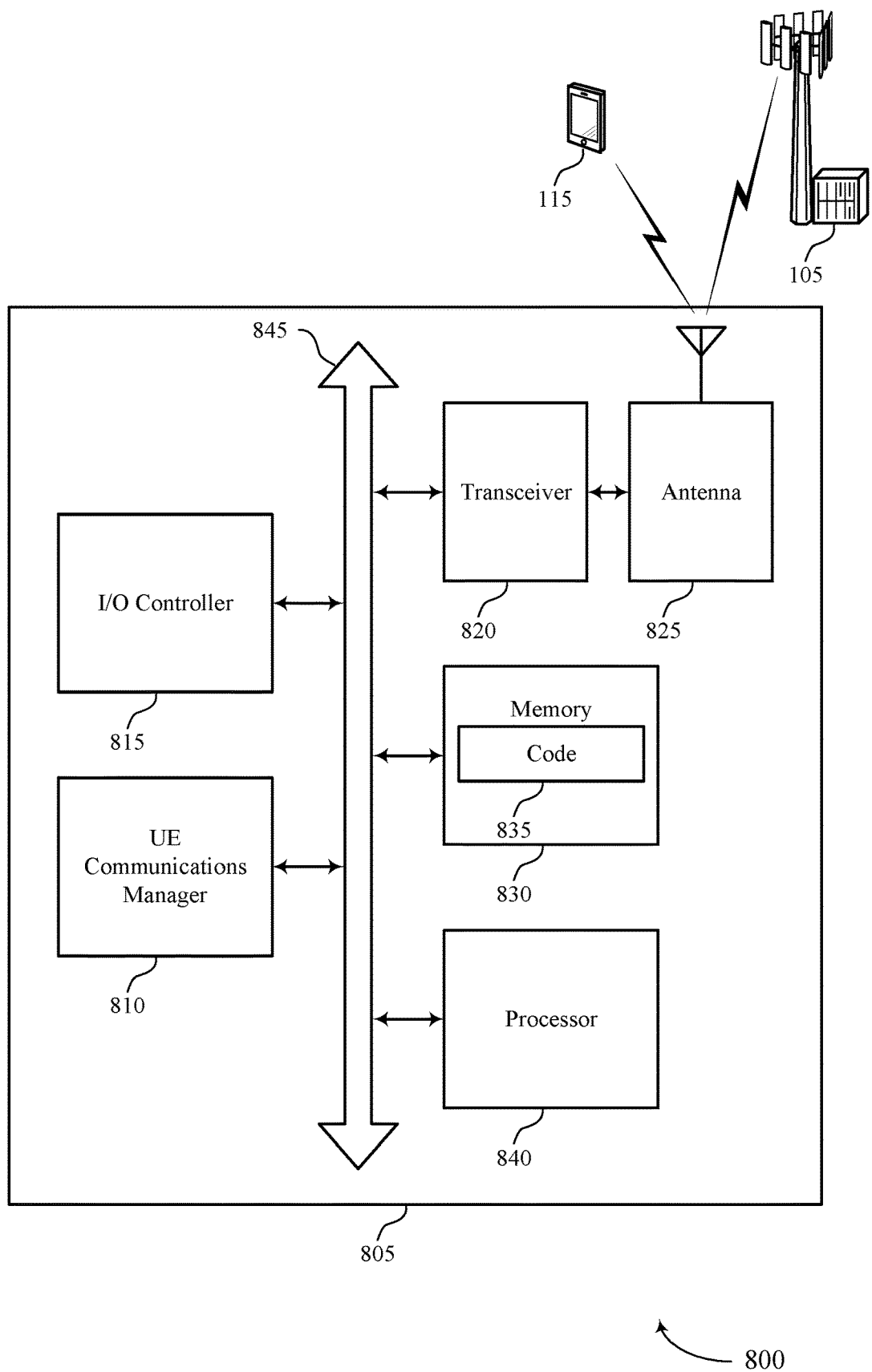
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive, in a CORESET, a DCI message scheduling an uplink shared channel, the received DCI message including a SRI field and transmit, on the uplink shared channel, according to one or more uplink transmission parameters, the one or more uplink transmission parameters based at least in part on the SRI field in the received DCI message and a value of a CORESET pool index associated with the CORESET.

The UE communications manager 810 may also receive, in a first CORESET, a first DCI message scheduling a first uplink shared channel, the first CORESET corresponding to a first CORESET pool index, receive, in a second CORE-SET, a second DCI message scheduling a second uplink shared channel, the second CORESET corresponding to a second CORESET pool index different from the first CORE-SET pool index, where the second DCI message is received before transmission of the first uplink shared channel, and transmit both the first uplink shared channel and the second uplink shared channel based on the first uplink shared channel and the second uplink shared channel corresponding to a same HARQ process.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-DCI message related to PUSCHs).

Figure 9:
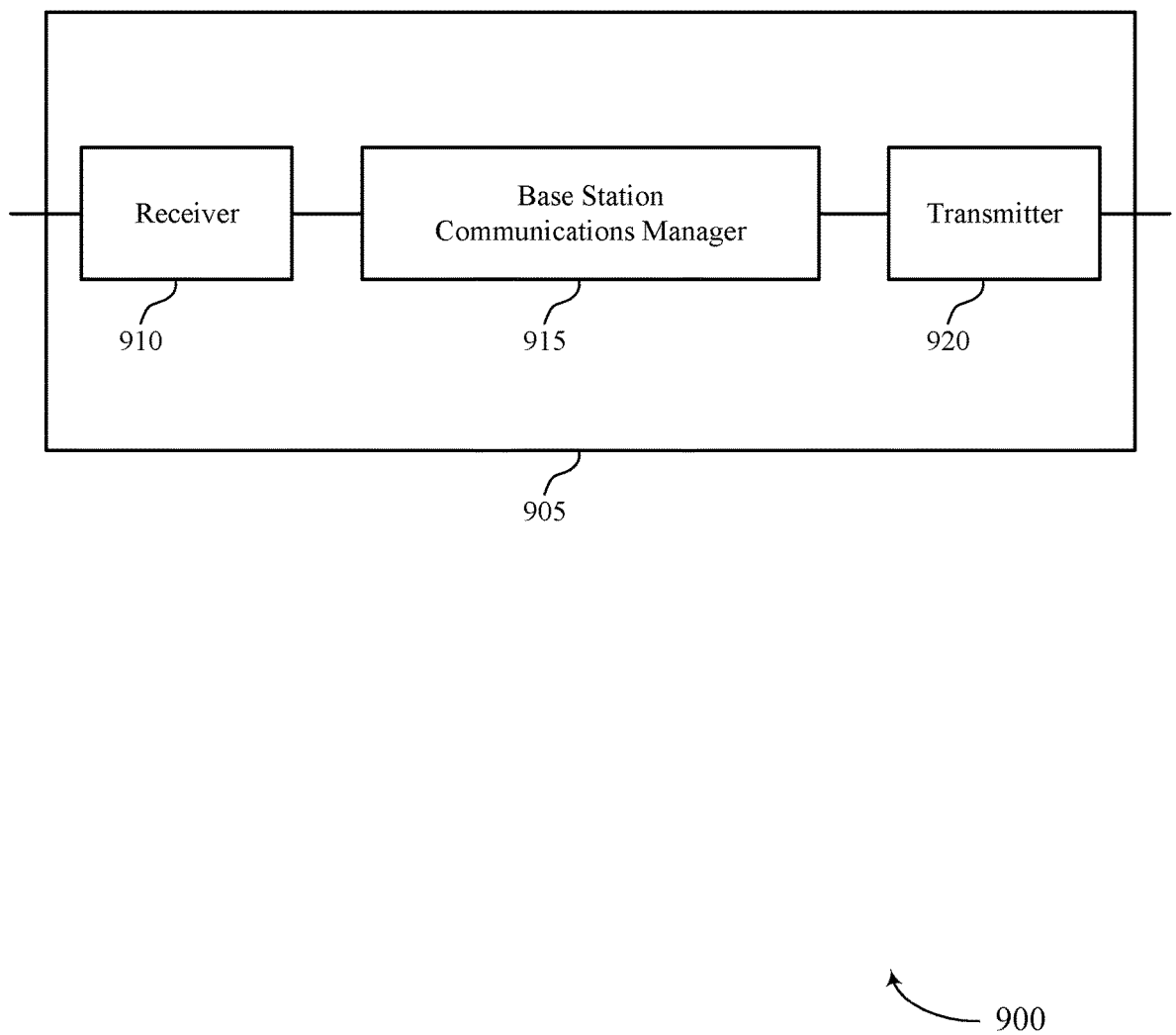
FIGS. 9 and 10 show diagrams of devices in accordance with aspects of the present disclosure.

FIG. 9 shows a diagram 900 of a device 905 in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multi-DCI message related to PUSCHs, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, in a CORESET associated with a set of CORESETs, a DCI message scheduling an uplink shared channel, the DCI message including a SRI field and receive an uplink transmission associated with the uplink shared channel according to one or more uplink transmission parameters associated with the SRI field. The base station communications manager 915 may also transmit, in a first CORESET, a first DCI message scheduling a first uplink shared channel, the first CORESET corresponding to a first CORESET pool index, transmit, in a second CORESET, a second DCI message scheduling a second uplink shared channel, the second CORESET corresponding to a second CORESET pool index different from the first CORESET pool index, and receive both the first uplink shared channel and the second uplink shared channel based on the first uplink shared channel and the second uplink shared channel corresponding to a same HARQ process, where the second DCI message is received before reception of the first uplink shared channel. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
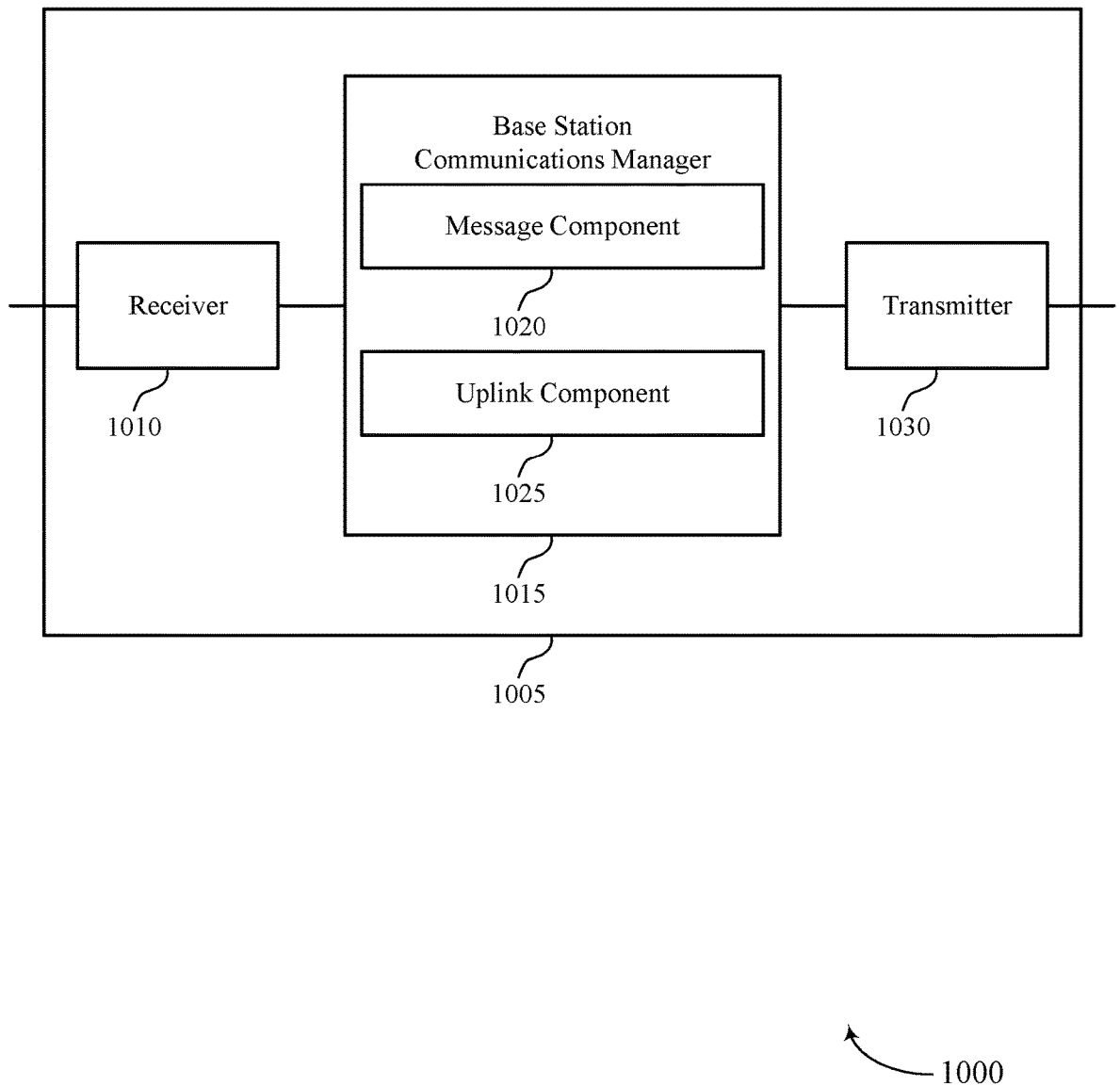

FIG. 10 shows a diagram 1000 of a device 1005 in accordance with aspects of the present disclosure. The device 1005 may be an example of aspects of a device 905, or a base station 105 as described herein. The device 1005 may include a receiver 1010, a base station communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-DCI message related to PUSCHs, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a message component 1020 and an uplink component 1025. The base station communications manager 1015 may be an example of aspects of the base station communications manager 1210 described herein.

The message component 1020 may transmit, in a CORESET associated with a set of CORESETs, a DCI message scheduling an uplink shared channel, the DCI message including an SRI field. The uplink component 1025 may receive an uplink transmission associated with the uplink shared channel according to one or more uplink transmission parameters associated with the SRS resource indicator field. The message component 1020 may transmit, in a first CORESET, a first DCI message scheduling a first uplink shared channel, the first CORESET corresponding to a first CORESET pool index and transmit, in a second CORESET, a second DCI message scheduling a second uplink shared channel, the second CORESET corresponding to a second CORESET pool index different from the first CORESET pool index. The uplink component 1025 may receive both the first uplink shared channel and the second uplink shared channel based on the first uplink shared channel and the second uplink shared channel corresponding to a same HARQ process, where the second DCI message is received before reception of the first uplink shared channel.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
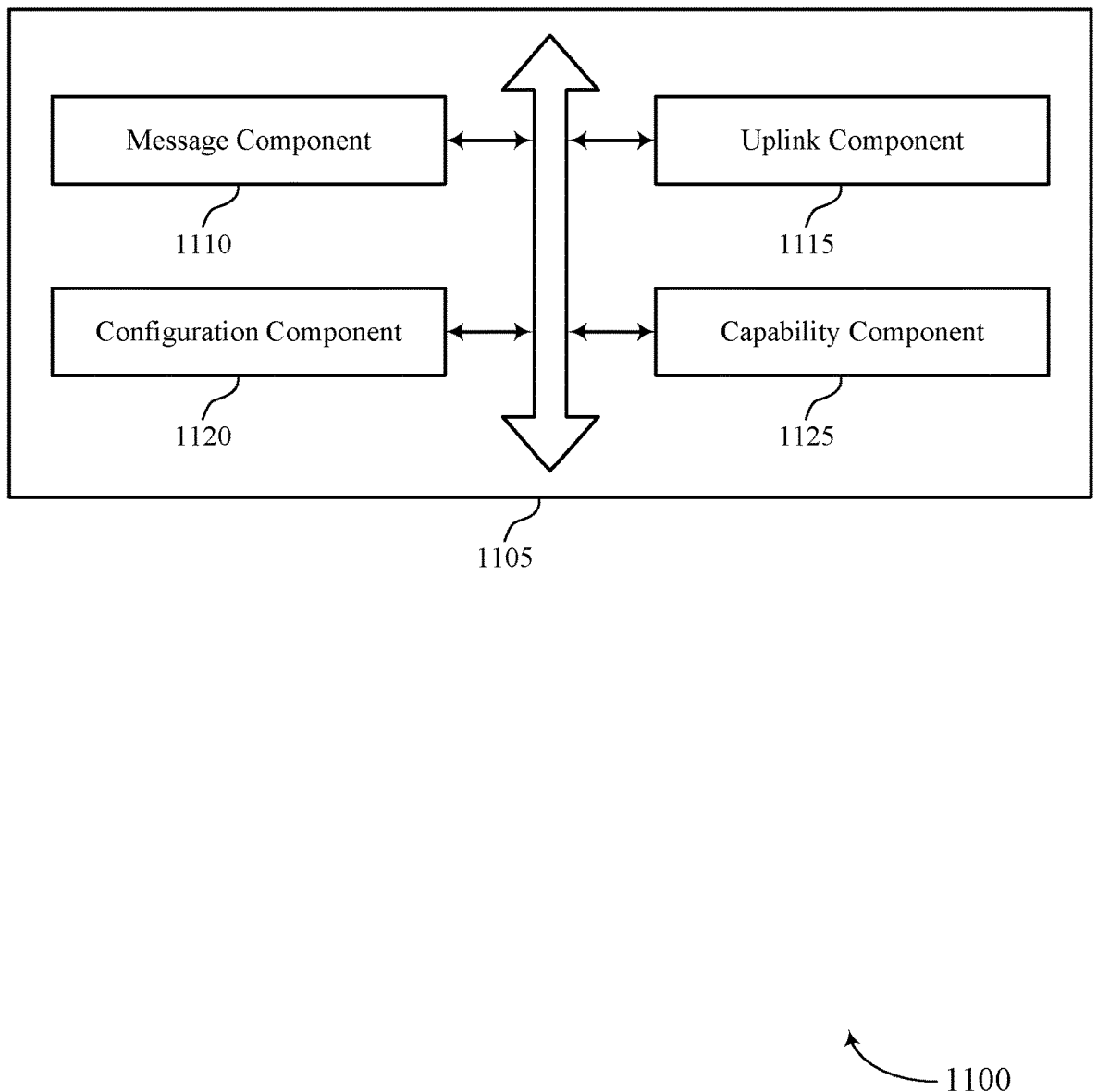
FIG. 11 shows a diagram of a base station communications manager in accordance with aspects of the present disclosure.

FIG. 11 shows a diagram 1100 of a base station communications manager 1105 in accordance with aspects of the present disclosure. The base station communications manager 1105 may be an example of aspects of a base station communications manager 915, a base station communications manager 1015, or a base station communications manager 1210 described herein. The base station communications manager 1105 may include a message component 1110, an uplink component 1115, a configuration component 1120, and a capability component 1125. Each of these components may communicate, directly or indirectly, with one another (e.g., via one or more buses).

The message component 1110 may transmit, in a CORESET associated with a set of CORESETs, a DCI message scheduling an uplink shared channel, the DCI message including an SRI field. In some examples, the message component 1110 may transmit, in a first CORESET, a first DCI message scheduling a first uplink shared channel, the first CORESET corresponding to a first CORESET pool index. In some examples, the message component 1110 may transmit, in a second CORESET, a second DCI message scheduling a second uplink shared channel, the second CORESET corresponding to a second CORESET pool index different from the first CORESET pool index. In some cases, one or both of the first DCI message includes a first NDI and the second DCI message includes a second NDI, and a value of the first NDI in the first DCI message and a value of the second NDI in the second DCI message indicate a same value.

The uplink component 1115 may receive an uplink transmission associated with the uplink shared channel according to one or more uplink transmission parameters associated with the SRI field. In some examples, the uplink component 1115 may receive both the first uplink shared channel and the second uplink shared channel based on the first uplink shared channel and the second uplink shared channel corresponding to a same HARQ process, where the second DCI message is received before reception of the first uplink shared channel.

In some examples, the uplink component 1115 may receive the uplink transmission based on a SRS resource set determined from at least two SRS resource sets to use for the uplink shared channel based on a value of a CORESET pool index associated with the CORESET. In some cases, the first uplink shared channel and the second uplink shared channel correspond to a same transport block. In some cases, the first uplink shared channel and the second uplink shared channel correspond to a same transport block size. In some cases, a value of an uplink shared channel field in the first DCI message and a value of an uplink shared channel field in the second DCI message indicate a same value. In some cases, a value of a CBGTI field in the first DCI message and a value of a CBGTI field in the second DCI message indicate a same set of code block groups. In some cases, the first uplink shared channel and the second uplink shared channel are nonoverlapping in a time domain. In some cases, a value of a priority indicator field in the first DCI message and a value of a priority indicator field in the second DCI message indicate a same priority.

The configuration component 1120 may transmit, via a higher layer signaling, a configuration including a first association between a first value of the CORESET pool index and a first SRS resource set and a second association between a second value of the CORESET pool index and a second SRS resource set. In some examples, the configuration component 1120 may transmit, via a higher layer signaling, a configuration including a first association between a first value of the CORESET pool index and a first set of TCI states for the uplink shared channel and a second association between a second value of the CORESET pool index and a second set of TCI states for the uplink shared channel. In some examples, the configuration component 1120 may transmit, via a higher layer signaling, a configuration including a first association between a first value of the CORESET pool index and a first list of one or more uplink shared channel power control parameters and a second association between a second value of the CORESET pool index and a second list of one or more uplink shared channel power control parameters. In some examples, the configuration component 1120 may transmit, via a higher layer signaling, a configuration including a list of one or more uplink shared channel power control parameters.

In some cases, one or both of the first SRS resource set and the second SRS resource set correspond to a codebook-based usage. In some cases, one or both of the first SRS resource set and the second SRS resource set correspond to a noncodebook-based usage. In some cases, the higher layer signaling includes an RRC signaling. In some cases, the SRI field indicates that one or more SRS resources correspond to a first SRS resource set based on the value of the CORESET pool index. In some cases, the SRI field indicates that one or more SRS resources correspond to a second SRS resource set based on the value of the CORESET pool index.

In some cases, the one or more uplink transmission parameters includes a directional beam for the uplink shared channel, a precoding for the uplink shared channel, a rank for the uplink shared channel, or a power control parameter of the uplink shared channel, or a combination thereof. In some cases, a TCI field indicates that the TCI state corresponds to a first set of TCI states based on the value of the CORESET pool index. In some cases, a TCI field indicates that the TCI state corresponds to a second set of TCI states based on the value of the CORESET pool index. In some cases, the higher layer signaling includes a MAC-CE signaling. In some cases, the one or more uplink power control parameter corresponds to the SRI field in the DCI message pointing to an uplink shared channel power control index in the first list or the second list. In some cases, the one or more uplink power control parameters include a pathloss parameter corresponding to a reference signal power, a ratio for a pathloss compensation, an offset value, or a closed loop power control index, or a combination thereof.

The capability component 1125 may receive capability information from a UE, the capability information indicating a capability for the UE to jointly transmit the first uplink shared channel and the second uplink shared channel, where the first DCI message and the second DCI message are received in different CORESETs and correspond to different values of CORESET pool indices, and the second DCI message is received before reception of the first uplink shared channel.

Figure 12:
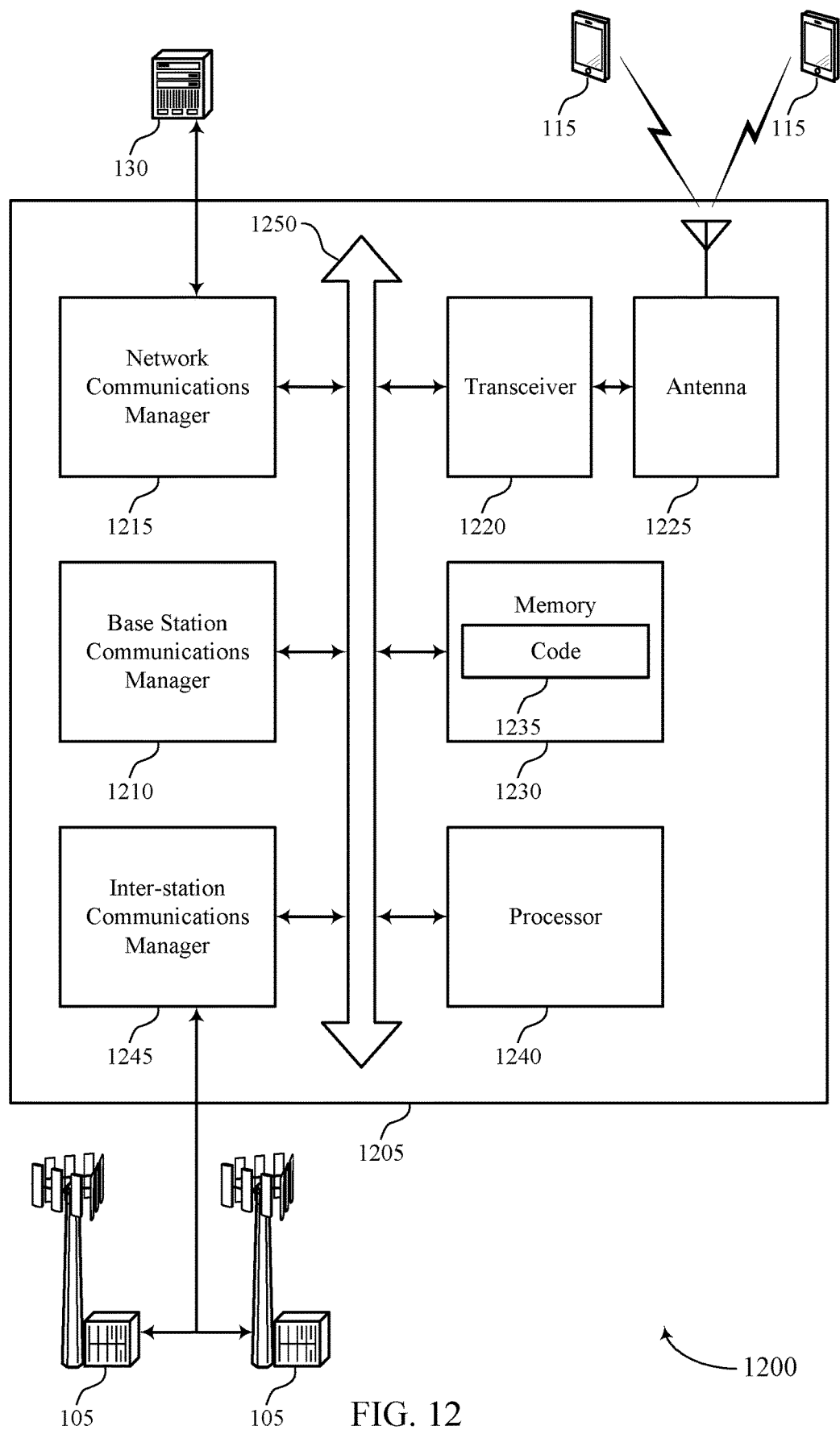
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, in a CORESET associated with a set of CORESETs, a DCI message scheduling an uplink shared channel, the DCI message including an SRI field. The base station communications manager 1210 may receive an uplink transmission associated with the uplink shared channel according to one or more uplink transmission parameters associated with the SRI field. The base station communications manager 1210 may also transmit, in a first CORESET, a first DCI message scheduling a first uplink shared channel, the first CORESET corresponding to a first CORESET pool index. The base station communications manager 1210 may transmit, in a second CORESET, a second DCI message scheduling a second uplink shared channel. The second CORESET may correspond to a second CORESET pool index different from the first CORESET pool index. The base station communications manager 1210 may receive both the first uplink shared channel and the second uplink shared channel based on the first uplink shared channel and the second uplink shared channel corresponding to a same HARQ process, where the second DCI message is received before reception of the first uplink shared channel.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases, the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting multi-DCI message related to PUSCHs).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
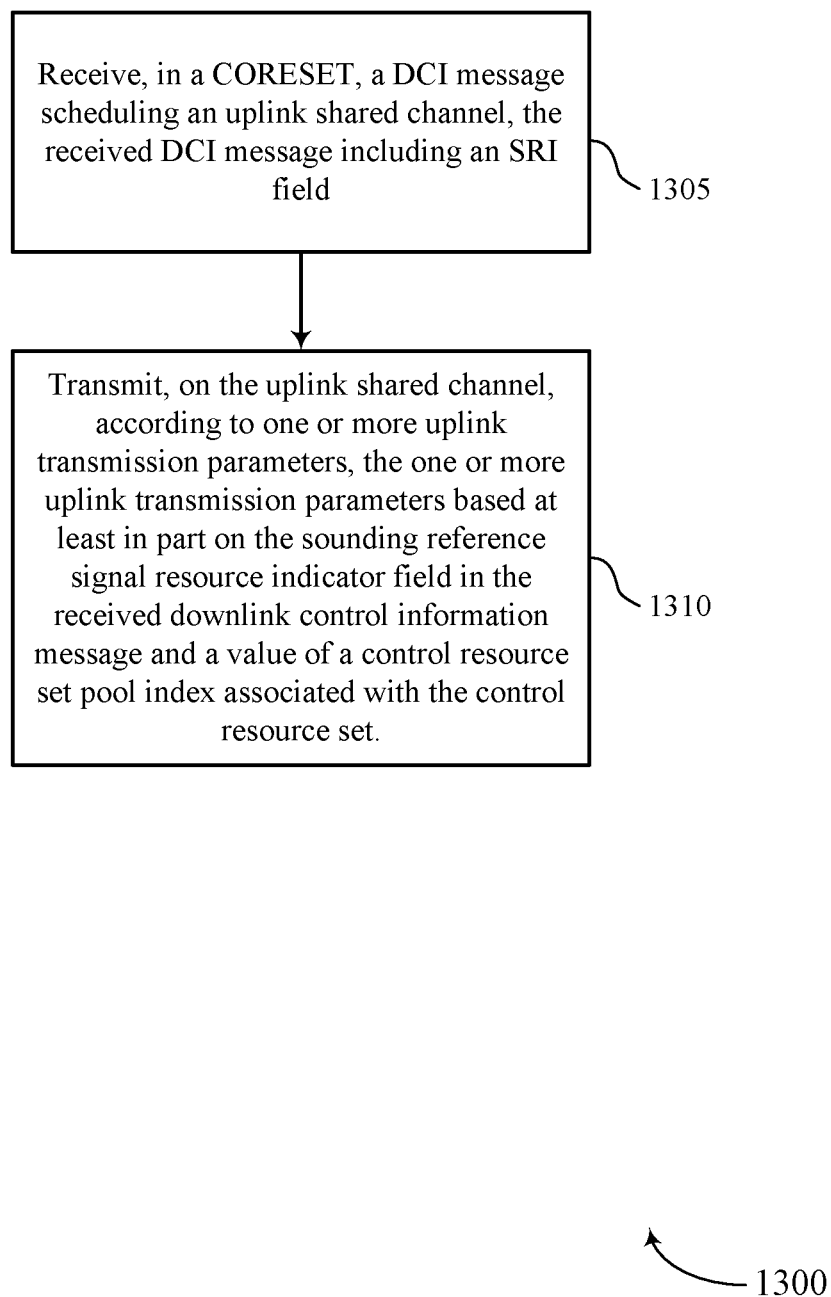
FIGS. 13 through 17 show flowcharts illustrating methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, in a CORESET, a DCI message scheduling an uplink shared channel, the received DCI message including an SRI field. The operations of 1305 may be performed according to the methods described herein. In some examples, aspects of the operations of 1305 may be performed by a message component as described with reference to FIGS. 5 through 8.

At 1310, the UE may transmit, on the uplink shared channel, according to one or more uplink transmission parameters, the one or more uplink transmission parameters based at least in part on the SRI field in the received DCI message and a value of a CORESET pool index associated with the CORESET. The operations of 1310 may be performed according to the methods described herein. In some examples, aspects of the operations of 1310 may be performed by an uplink component as described with reference to FIGS. 5 through 8.

Figure 14:
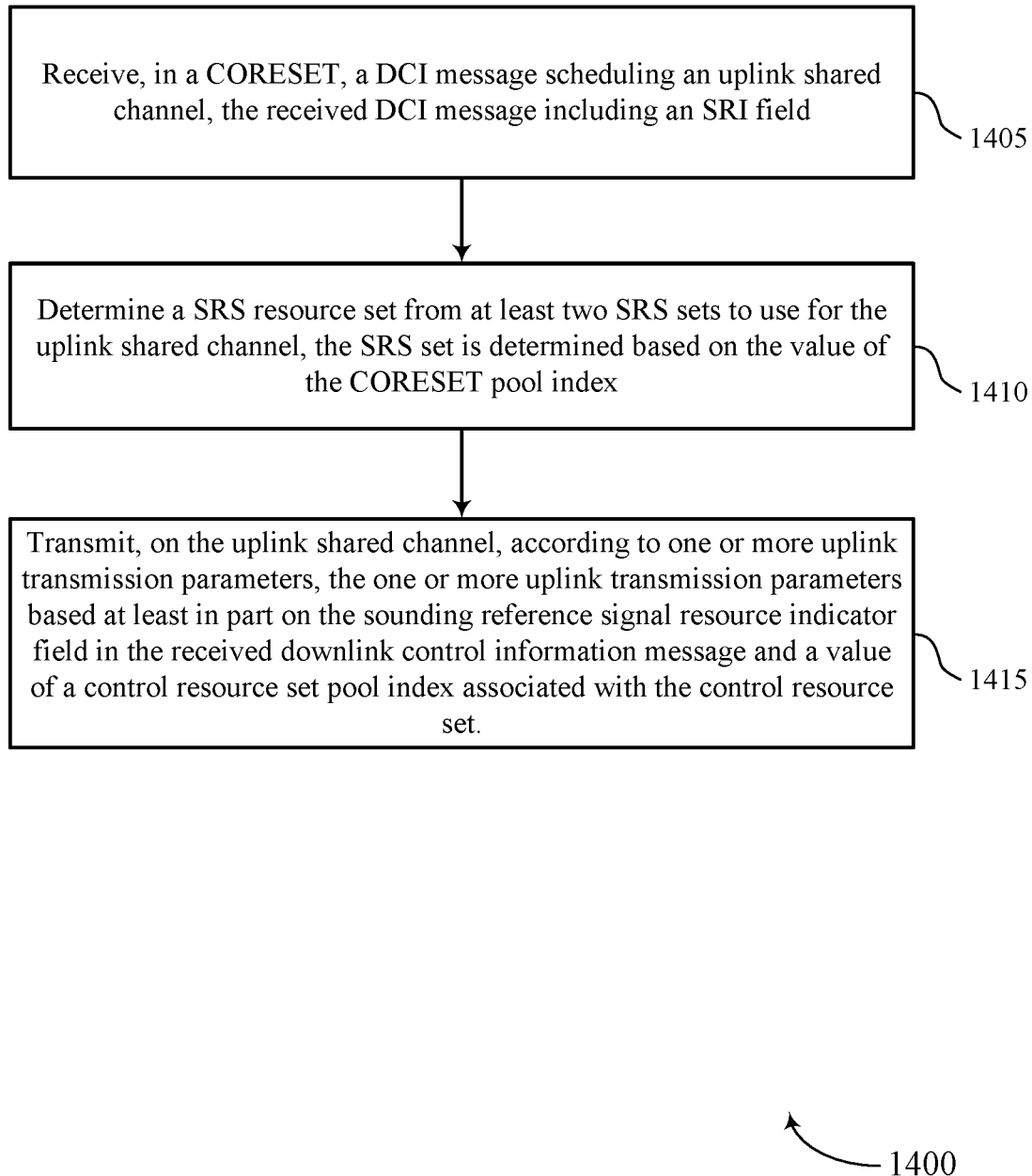

FIG. 14 shows a flowchart illustrating a method 1400 in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, in a CORESET, a DCI message scheduling an uplink shared channel, the received DCI message including an SRI field. The operations of 1405 may be performed according to the methods described herein. In some examples, aspects of the operations of 1405 may be performed by a message component as described with reference to FIGS. 5 through 8.

At 1410, the UE may determine a SRS resource set from at least two SRS resource sets to use for the uplink shared channel, the SRS resource set is determined based on the value of the CORESET pool index. The operations of 1410 may be performed according to the methods described herein. In some examples, aspects of the operations of 1410 may be performed by a parameter component as described with reference to FIGS. 5 through 8.

At 1415, the UE may transmit, on the uplink shared channel, according to one or more uplink transmission parameters and the determined SRS resource set, the one or more uplink transmission parameters based at least in part on the SRI field in the received DCI message and a value of a CORESET pool index associated with the CORESET. The operations of 1415 may be performed according to the methods described herein. In some examples, aspects of the operations of 1415 may be performed by an uplink component as described with reference to FIGS. 5 through 8.

Figure 15:
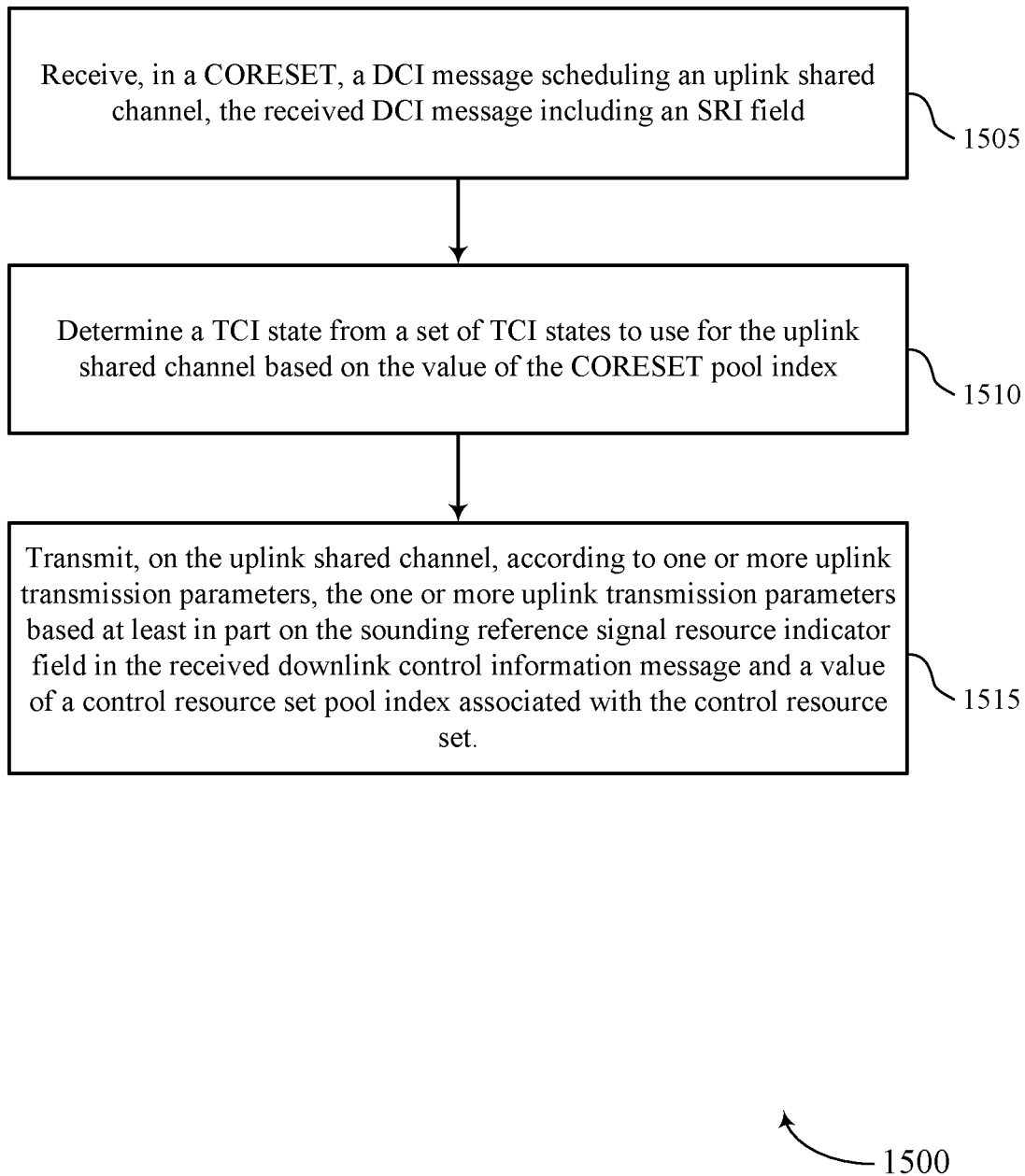

FIG. 15 shows a flowchart illustrating a method 1500 in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, in a CORESET, a DCI message scheduling an uplink shared channel, the received DCI message including an SRI field. The operations of 1505 may be performed according to the methods described herein. In some examples, aspects of the operations of 1505 may be performed by a message component as described with reference to FIGS. 5 through 8.

At 1510, the UE may determine a TCI state from a set of TCI states to use for the uplink shared channel based on the value of the CORESET pool index. The operations of 1510 may be performed according to the methods described herein. In some examples, aspects of the operations of 1510 may be performed by a configuration component as described with reference to FIGS. 5 through 8.

At 1515, the UE may transmit, on the uplink shared channel, according to one or more uplink transmission parameters and the determined TCI state, the one or more uplink transmission parameters based at least in part on the SRI field in the received DCI message and a value of a CORESET pool index associated with the CORESET. The operations of 1515 may be performed according to the methods described herein. In some examples, aspects of the operations of 1515 may be performed by an uplink component as described with reference to FIGS. 5 through 8.

Figure 16:
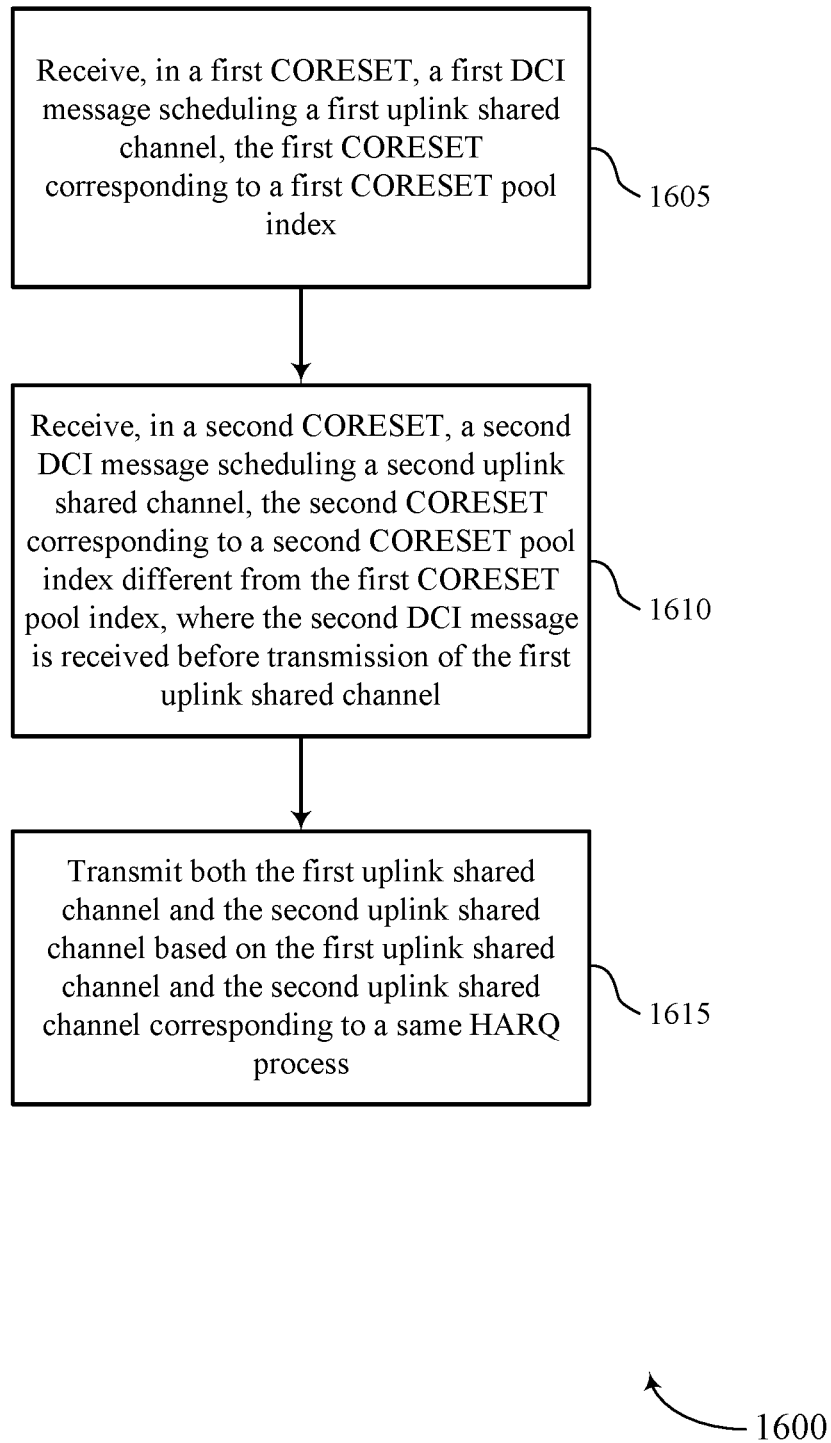

FIG. 16 shows a flowchart illustrating a method 1600 in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, in a first CORESET, a first DCI message scheduling a first uplink shared channel, the first CORESET corresponding to a first CORESET pool index. The operations of 1605 may be performed according to the methods described herein. In some examples, aspects of the operations of 1605 may be performed by a message component as described with reference to FIGS. 5 through 8.

At 1610, the UE may receive, in a second CORESET, a second DCI message scheduling a second uplink shared channel, the second CORESET corresponding to a second CORESET pool index different from the first CORESET pool index, where the second DCI message is received before transmission of the first uplink shared channel. The operations of 1610 may be performed according to the methods described herein. In some examples, aspects of the operations of 1610 may be performed by a message component as described with reference to FIGS. 5 through 8.

At 1615, the UE may transmit both the first uplink shared channel and the second uplink shared channel based on the first uplink shared channel and the second uplink shared channel correspond to a same HARQ process. The operations of 1615 may be performed according to the methods described herein. In some examples, aspects of the operations of 1615 may be performed by an uplink component as described with reference to FIGS. 5 through 8.

Figure 17:
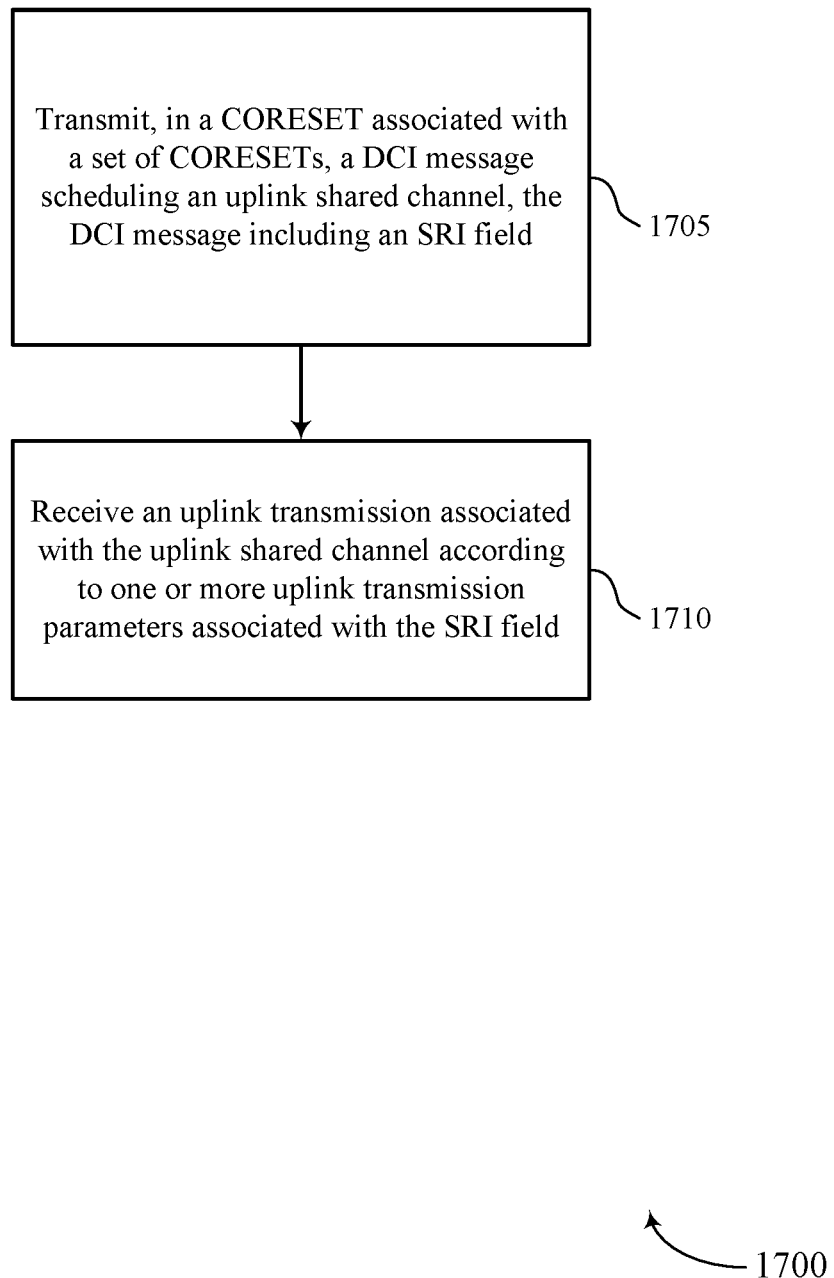

FIG. 17 shows a flowchart illustrating a method 1700 in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, in a CORESET associated with a set of CORESETs, a DCI message scheduling an uplink shared channel, the DCI message including an SRI field. The operations of 1705 may be performed according to the methods described herein. In some examples, aspects of the operations of 1705 may be performed by a message component as described with reference to FIGS. 9 through 12.

At 1710, the base station may receive an uplink transmission associated with the uplink shared channel according to one or more uplink transmission parameters associated with the SRI field. The operations of 1710 may be performed according to the methods described herein. In some examples, aspects of the operations of 1710 may be performed by an uplink component as described with reference to FIGS. 9 through 12.

The following provides an overview of aspects of the present disclosure:

Aspect 1: A method for wireless communications at a UE, comprising: receiving, in a first control resource set, a first downlink control information message scheduling a first uplink shared channel, the first control resource set corresponding to a first control resource set pool index; receiving, in a second control resource set, a second downlink control information message scheduling a second uplink shared channel, the second control resource set corresponding to a second control resource set pool index different from the first control resource set pool index, wherein the second downlink control information message is received before transmission of the first uplink shared channel; and transmitting both the first uplink shared channel and the second uplink shared channel based at least in part on the first uplink shared channel and the second uplink shared channel corresponding to a same hybrid automatic repeat request process.

Aspect 2: The method of aspect 1, wherein one or both of the first downlink control information message includes a first new data indicator and the second downlink control information message includes a second new data indicator, and a value of the first new data indicator in the first downlink control information message and a value of the second new data indicator in the second downlink control information message indicate a same value.

Aspect 3: The method of any of aspects 1 through 2, further comprising: determining a transport block for one or both of the first uplink shared channel and the second uplink shared channel, wherein the first uplink shared channel and the second uplink shared channel correspond to a same transport block.

Aspect 4: The method of any of aspects 1 through 3, further comprising: determining a transport block size for one or both of the first uplink shared channel and the second uplink shared channel, wherein the first uplink shared channel and the second uplink shared channel correspond to a same transport block size.

Aspect 5: The method of any of aspects 1 through 4, wherein a value of an uplink shared channel field in the first downlink control information message and a value of an uplink shared channel field in the second downlink control information message indicate a same value.

Aspect 6: The method of any of aspects 1 through 5, wherein a value of a code block group transmission indicator field in the first downlink control information message and a value of a code block group transmission indicator field in the second downlink control information message indicate a same set of code block groups.

Aspect 7: The method of any of aspects 1 through 6, wherein the first uplink shared channel and the second uplink shared channel are nonoverlapping in a time domain.

Aspect 8: The method of any of aspects 1 through 7, wherein a value of a priority indicator field in the first downlink control information message and a value of a priority indicator field in the second downlink control information message indicate a same priority.

Aspect 9: The method of any of aspects 1 through 8, further comprising: transmitting capability information to a base station, the capability information indicating a capability to jointly transmit the first uplink shared channel and the second uplink shared channel wherein the first downlink control information message and the second downlink control information message are received in different control resource sets and correspond to different values of control resource set pool indices, and the second downlink control information message is received before transmission of the first uplink shared channel.

Aspect 10: A method for wireless communications at a UE, comprising: receiving, in a control resource set, a downlink control information message scheduling an uplink shared channel, the received downlink control information message including a sounding reference signal resource indicator field; and transmitting, on the uplink shared channel, according to one or more uplink transmission parameters, the one or more uplink transmission parameters based at least in part on the sounding reference signal resource indicator field in the received downlink control information message and a value of a control resource set pool index associated with the control resource set.

Aspect 11: The method of aspect 10, further comprising: determining a sounding reference signal resource set from at least two sounding reference signal resource sets to use for the uplink shared channel, the sounding reference signal resource set is determined based at least in part on the value of the control resource set pool index.

Aspect 12: The method of aspect 11, wherein receiving, via a higher layer signaling, a configuration comprising a first association between a first value of the control resource set pool index and a first sounding reference signal resource set and a second association between a second value of the control resource set pool index and a second sounding reference signal resource set, wherein determining the sounding reference signal resource set from the at least two sounding reference signal resource sets comprises: determining that the sounding reference signal resource set corresponds to the first sounding reference signal resource set based at least in part on the first value of the control resource set pool index or to the second sounding reference signal resource set based at least in part on the second value of the control resource set pool index.

Aspect 13: The method of aspect 12, further comprising: determining that one or both of the first sounding reference signal resource set and the second sounding reference signal resource set correspond to a codebook-based usage.

Aspect 14: The method of any of aspects 12 through 13, further comprising: determining that one or both of the first sounding reference signal resource set and the second sounding reference signal resource set correspond to a noncodebook-based usage.

Aspect 15: The method of any of aspects 12 through 14, wherein the higher layer signaling comprises a radio resource control signaling.

Aspect 16: The method of any of aspects 10 through 15, further comprising: identifying one or more sounding reference signal resources based at least in part on the sounding reference signal resource indicator field in the received downlink control information message.

Aspect 17: The method of aspect 16, wherein the sounding reference signal resource indicator field indicates that the one or more sounding reference signal resources correspond to a first sounding reference signal resource set based at least in part on the value of the control resource set pool index.

Aspect 18: The method of any of aspects 16 through 17, wherein the sounding reference signal resource indicator field indicates that the one or more sounding reference signal resources correspond to a second sounding reference signal resource set based at least in part on the value of the control resource set pool index.

Aspect 19: The method of any of aspects 16 through 18, further comprising: determining the one or more uplink transmission parameters based at least in part on the one or more sounding reference signal resources, wherein the one or more uplink transmission parameters comprises a directional beam for the uplink shared channel, a precoding for the uplink shared channel, a rank for the uplink shared channel, or a power control parameter of the uplink shared channel, or a combination thereof Aspect 20: The method of any of aspects 10 through 19, comprising: determining a transmission configuration indicator state from a set of transmission configuration indicator states to use for the uplink shared channel based at least in part on the value of the control resource set pool index, wherein transmitting, on the uplink shared channel, comprises: transmitting, on the uplink shared channel, according to the determined transmission configuration indicator state.

Aspect 21: The method of aspect 20, further comprising: receiving, via a higher layer signaling, a configuration comprising a first association between a first value of the control resource set pool index and a first set of transmission configuration indicator states for the uplink shared channel and a second association between a second value of the control resource set pool index and a second set of transmission configuration indicator states for the uplink shared channel.

Aspect 22: The method of aspect 21, wherein the higher layer signaling comprises a radio resource control signaling.

Aspect 23: The method of any of aspects 21 through 22, wherein the higher layer signaling comprises a medium access control-control element signaling.

Aspect 24: The method of any of aspects 20 through 23, further comprising: identifying the transmission configuration indicator state to use for the uplink shared channel based at least in part on a transmission configuration indicator field in the received downlink control information message.

Aspect 25: The method of aspect 24, wherein the transmission configuration indicator field indicates that the transmission configuration indicator state corresponds to a first set of transmission configuration indicator states based at least in part on the value of the control resource set pool index.

Aspect 26: The method of any of aspects 24 through 25, wherein the transmission configuration indicator field indicates that the transmission configuration indicator state corresponds to a second set of transmission configuration indicator states based at least in part on the value of the control resource set pool index.

Aspect 27: The method of any of aspects 10 through 26, comprising: receiving, via a higher layer signaling, a configuration comprising a first association between a first value of the control resource set pool index and a first list of one or more uplink shared channel power control parameters and a second association between a second value of the control resource set pool index and a second list of one or more uplink shared channel power control parameters.

Aspect 28: The method of aspect 27, further comprising: determining to use the first list of the one or more uplink shared channel power control parameters or the second list of the one or more uplink shared channel power control parameters based at least in part on identifying the value of the control resource set pool index associated with the control resource set.

Aspect 29: The method of any of aspects 27 through 28, further comprising: determining one or more uplink power control parameters based at least in part on the sounding reference signal resource indicator field in the received downlink control information message pointing to an uplink shared channel power control index in the first list or the second list, wherein transmitting, on the uplink shared channel, comprises: transmitting, on the uplink shared channel, according to the determined one or more uplink power control parameters.

Aspect 30: The method of aspect 29, wherein the one or more uplink power control parameters comprise a pathloss parameter corresponding to a reference signal power, a ratio for a pathloss compensation, an offset value, or a closed loop power control index, or a combination thereof.

Aspect 31: The method of any of aspects 10 through 30, comprising: receiving, via a higher layer signaling, a configuration comprising a list of one or more uplink shared channel power control parameters.

Aspect 32: The method of aspect 31, further comprising: determining an uplink shared channel power control index associated with the list of the one or more uplink shared channel power control parameters based at least in part on a value of the sounding reference signal resource indicator field in the received downlink control information message, the value of the control resource set pool index, and a number of sounding reference signal resource indicator codepoints.

Aspect 33: The method of aspect 32, wherein a size of the list of the one or more uplink shared channel power control parameters is larger than the number of sounding reference signal resource indicator codepoints.

Aspect 34: A method for wireless communications at a base station, comprising: transmitting, in a control resource set associated with a set of control resource sets, a downlink control information message scheduling an uplink shared channel, the downlink control information message including a sounding reference signal resource indicator field; and receiving an uplink transmission associated with the uplink shared channel according to one or more uplink transmission parameters associated with the sounding reference signal resource indicator field.

Aspect 35: The method of aspect 34, wherein receiving the uplink transmission is further based at least in part on a sounding reference signal resource set determined from at least two sounding reference signal resource sets to use for the uplink shared channel based at least in part on a value of a control resource set pool index associated with the control resource set.

Aspect 36: The method of any of aspects 34 through 35, further comprising: transmitting, via a higher layer signaling, a configuration comprising a first association between a first value of the control resource set pool index and a first sounding reference signal resource set and a second association between a second value of the control resource set pool index and a second sounding reference signal resource set.

Aspect 37: The method of aspect 36, wherein one or both of the first sounding reference signal resource set and the second sounding reference signal resource set correspond to a codebook-based usage.

Aspect 38: The method of any of aspects 36 through 37, wherein one or both of the first sounding reference signal resource set and the second sounding reference signal resource set correspond to a noncodebook-based usage.

Aspect 39: The method of any of aspects 36 through 38, wherein the higher layer signaling comprises a radio resource control signaling.

Aspect 40: The method of any of aspects 36 through 39, wherein the sounding reference signal resource indicator field indicates that one or more sounding reference signal resources correspond to a first sounding reference signal resource set based at least in part on the value of the control resource set pool index.

Aspect 41: The method of any of aspects 36 through 40, wherein the sounding reference signal resource indicator field indicates that one or more sounding reference signal resources correspond to a second sounding reference signal resource set based at least in part on the value of the control resource set pool index.

Aspect 42: The method of any of aspects 34 through 41, wherein the one or more uplink transmission parameters comprises a directional beam for the uplink shared channel, a precoding for the uplink shared channel, a rank for the uplink shared channel, or a power control parameter of the uplink shared channel, or a combination thereof.

Aspect 43: The method of any of aspects 34 through 42, further comprising: transmitting, via a higher layer signaling, a configuration comprising a first association between a first value of the control resource set pool index and a first set of transmission configuration indicator states for the uplink shared channel and a second association between a second value of the control resource set pool index and a second set of transmission configuration indicator states for the uplink shared channel.

Aspect 44: The method of aspect 43, wherein a transmission configuration indicator field indicates that the transmission configuration indicator state corresponds to a first set of transmission configuration indicator states based at least in part on the value of the control resource set pool index.

Aspect 45: The method of any of aspects 43 through 44, wherein a transmission configuration indicator field indicates that the transmission configuration indicator state corresponds to a second set of transmission configuration indicator states based at least in part on the value of the control resource set pool index.

Aspect 46: The method of any of aspects 43 through 45, wherein the higher layer signaling comprises a radio resource control signaling.

Aspect 47: The method of any of aspects 43 through 46, wherein the higher layer signaling comprises a medium access control-control element signaling.

Aspect 48: The method of any of aspects 34 through 47, further comprising: transmitting, via a higher layer signaling, a configuration comprising a first association between a first value of the control resource set pool index and a first list of one or more uplink shared channel power control parameters and a second association between a second value of the control resource set pool index and a second list of one or more uplink shared channel power control parameters.

Aspect 49: The method of aspect 48, wherein the one or more uplink power control parameter correspond to the sounding reference signal resource indicator field in the downlink control information message pointing to an uplink shared channel power control index in the first list or the second list.

Aspect 50: The method of aspect 49, wherein the one or more uplink power control parameters comprise a pathloss parameter corresponding to a reference signal power, a ratio for a pathloss compensation, an offset value, or a closed loop power control index, or a combination thereof Aspect 51: The method of any of aspects 34 through 50, further comprising: transmitting, via a higher layer signaling, a configuration comprising a list of one or more uplink shared channel power control parameters.

Aspect 52: A method for wireless communications at a base station, comprising: transmitting, in a first control resource set, a first downlink control information message scheduling a first uplink shared channel, the first control resource set corresponding to a first control resource set pool index; transmitting, in a second control resource set, a second downlink control information message scheduling a second uplink shared channel, the second control resource set corresponding to a second control resource set pool index different from the first control resource set pool index; and receiving both the first uplink shared channel and the second uplink shared channel based at least in part on the first uplink shared channel and the second uplink shared channel corresponding to a same hybrid automatic repeat request process, wherein the second downlink control information message is received before reception of the first uplink shared channel.

Aspect 53: The method of aspect 52, wherein one or both of the first downlink control information message includes a first new data indicator and the second downlink control information message includes a second new data indicator, and a value of the first new data indicator in the first downlink control information message and a value of the second new data indicator in the second downlink control information message indicate a same value.

Aspect 54: The method of any of aspects 52 through 53, wherein the first uplink shared channel and the second uplink shared channel correspond to a same transport block.

Aspect 55: The method of any of aspects 52 through 54, wherein the first uplink shared channel and the second uplink shared channel correspond to a same transport block size.

Aspect 56: The method of any of aspects 52 through 55, wherein a value of an uplink shared channel field in the first downlink control information message and a value of an uplink shared channel field in the second downlink control information message indicate a same value.

Aspect 57: The method of any of aspects 52 through 56, wherein a value of a code block group transmission indicator field in the first downlink control information message and a value of a code block group transmission indicator field in the second downlink control information message indicate a same set of code block groups.

Aspect 58: The method of any of aspects 52 through 57, wherein the first uplink shared channel and the second uplink shared channel are nonoverlapping in a time domain.

Aspect 59: The method of any of aspects 52 through 58, wherein a value of a priority indicator field in the first downlink control information message and a value of a priority indicator field in the second downlink control information message indicate a same priority.

Aspect 60: The method of any of aspects 52 through 59, further comprising: receiving capability information from a UE, the capability information indicating a capability for the UE to jointly transmit the first uplink shared channel and the second uplink shared channel, wherein the first downlink control information message and the second downlink control information message are received in different control resource sets and correspond to different values of control resource set pool indices, and the second downlink control information message is received before reception of the first uplink shared channel.

Aspect 61: An apparatus for wireless communications at a UE, comprising a processor; memory coupled with the processor; and instructions stored in the memory and executable by the processor to cause the apparatus to perform a method of any of aspects 1 through 9.

Aspect 62: An apparatus for wireless communications at a UE, comprising at least one means for performing a method of any of aspects 1 through 9.

Aspect 63: A non-transitory computer-readable medium storing code for wireless communications at a UE, the code comprising instructions executable by a processor to perform a method of any of aspects 1 through 9.

Aspect 64: An apparatus for wireless communications at a UE, comprising a processor; memory coupled with the processor; and instructions stored in the memory and executable by the processor to cause the apparatus to perform a method of any of aspects 10 through 33.

Aspect 65: An apparatus for wireless communications at a UE, comprising at least one means for performing a method of any of aspects 10 through 33.

Aspect 66: A non-transitory computer-readable medium storing code for wireless communications at a UE, the code comprising instructions executable by a processor to perform a method of any of aspects 10 through 33.

Aspect 67: An apparatus for wireless communications at a base station, comprising a processor; memory coupled with the processor; and instructions stored in the memory and executable by the processor to cause the apparatus to perform a method of any of aspects 34 through 51.

Aspect 68: An apparatus for wireless communications at a base station, comprising at least one means for performing a method of any of aspects 34 through 51.

Aspect 69: A non-transitory computer-readable medium storing code for wireless communications at a base station, the code comprising instructions executable by a processor to perform a method of any of aspects 34 through 51.

Aspect 70: An apparatus for wireless communications at a base station, comprising a processor; memory coupled with the processor; and instructions stored in the memory and executable by the processor to cause the apparatus to perform a method of any of aspects 52 through 60.

Aspect 71: An apparatus for wireless communications at a base station, comprising at least one means for performing a method of any of aspects 52 through 60.

Aspect 72: A non-transitory computer-readable medium storing code for wireless communications at a base station, the code comprising instructions executable by a processor to perform a method of any of aspects 52 through 60.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, via higher layer signaling, a configuration comprising a first association between a first value of a control resource set pool index and a first set of transmission configuration indicator states for an uplink shared channel and a second association between a second value of the control resource set pool index and a second set of transmission configuration indicator states for the uplink shared channel;
    receiving, in a control resource set, a downlink control information message scheduling the uplink shared channel, the received downlink control information message including a sounding reference signal resource indicator field;
    determining a transmission configuration indicator state to use for the uplink shared channel based at least in part on a value of the control resource set pool index for the control resource set; and
    transmitting, on the uplink shared channel, according to one or more uplink transmission parameters, the one or more uplink transmission parameters based at least in part on the sounding reference signal resource indicator field in the received downlink control information message, the value of a control resource set pool index associated with the control resource set, and the determined transmission configuration indicator state.

2. The method of claim 1, further comprising:
    determining a sounding reference signal resource set from at least two sounding reference signal resource sets to use for the uplink shared channel, the sounding reference signal resource set is determined based at least in part on the value of the control resource set pool index.

3. The method of claim 2, further comprising:
    receiving, via the higher layer signaling, a configuration comprising a first association between a first value of the control resource set pool index and a first sounding reference signal resource set and a second association between a second value of the control resource set pool index and a second sounding reference signal resource set, wherein determining the sounding reference signal resource set from the at least two sounding reference signal resource sets comprises:
  determining that the sounding reference signal resource set corresponds to the first sounding reference signal resource set based at least in part on the first value of the control resource set pool index or to the second sounding reference signal resource set based at least in part on the second value of the control resource set pool index.

4. The method of claim 3, further comprising:
  determining that one or both of the first sounding reference signal resource set and the second sounding reference signal resource set correspond to a codebook-based usage.

5. The method of claim 3, further comprising:
  determining that one or both of the first sounding reference signal resource set and the second sounding reference signal resource set correspond to a noncodebook-based usage.

6. The method of claim 1, further comprising:
  identifying one or more sounding reference signal resources based at least in part on the sounding reference signal resource indicator field in the received downlink control information message.

7. The method of claim 6, wherein the sounding reference signal resource indicator field indicates that the one or more sounding reference signal resources correspond to a first sounding reference signal resource set based at least in part on the value of the control resource set pool index.

8. The method of claim 6, wherein the sounding reference signal resource indicator field indicates that the one or more sounding reference signal resources correspond to a second sounding reference signal resource set based at least in part on the value of the control resource set pool index.

9. The method of claim 6, further comprising:
  determining the one or more uplink transmission parameters based at least in part on the one or more sounding reference signal resources, wherein the one or more uplink transmission parameters comprises a directional beam for the uplink shared channel, a precoding for the uplink shared channel, a rank for the uplink shared channel, or a power control parameter of the uplink shared channel.

10. The method of claim 1, further comprising:
  identifying the transmission configuration indicator state to use for the uplink shared channel based at least in part on a transmission configuration indicator field in the received downlink control information message.

11. The method of claim 10, wherein the transmission configuration indicator field indicates that the transmission configuration indicator state corresponds to a first set of transmission configuration indicator states based at least in part on the value of the control resource set pool index.

12. The method of claim 10, wherein the transmission configuration indicator field indicates that the transmission configuration indicator state corresponds to a second set of transmission configuration indicator states based at least in part on the value of the control resource set pool index.

13. The method of claim 1, further comprising:
  receiving, via the higher layer signaling, a configuration comprising a first association between a first value of the control resource set pool index and a first list of one or more uplink shared channel power control parameters and a second association between a second value of the control resource set pool index and a second list of one or more uplink shared channel power control parameters.

14. The method of claim 13, further comprising:
  determining to use the first list of the one or more uplink shared channel power control parameters or the second list of the one or more uplink shared channel power control parameters based at least in part on identifying the value of the control resource set pool index associated with the control resource set.

15. The method of claim 13, further comprising:
  determining one or more uplink power control parameters based at least in part on the sounding reference signal resource indicator field in the received downlink control information message pointing to an uplink shared channel power control index in the first list or the second list, wherein transmitting, on the uplink shared channel, comprises:
    transmitting, on the uplink shared channel, according to the determined one or more uplink power control parameters.

16. The method of claim 1, further comprising:
  receiving, via the higher layer signaling, a configuration comprising a list of one or more uplink shared channel power control parameters.

17. The method of claim 16, further comprising:
  determining an uplink shared channel power control index associated with the list of the one or more uplink shared channel power control parameters based at least in part on a value of the sounding reference signal resource indicator field in the received downlink control information message, the value of the control resource set pool index, and a number of sounding reference signal resource indicator codepoints.

18. An apparatus for wireless communications at a user equipment (UE), comprising:
  one or more processors,
  memory coupled with the one or more processors; and
  instructions stored in the memory and executable by the one or more processors individually or in combination, to cause the apparatus to:
    receive, via higher layer signaling, a configuration comprising a first association between a first value of a control resource set pool index and a first set of transmission configuration indicator states for an uplink shared channel and a second association between a second value of the control resource set pool index and a second set of transmission configuration indicator states for the uplink shared channel;
    receive, in a control resource set a downlink control information message scheduling the uplink shared channel, the received downlink control information message including a sounding reference signal resource indicator field;
    determine a transmission configuration indicator state to use for the uplink shared channel based at least in part on a value of the control resource set pool index for the control resource set; and
    transmit, on the uplink shared channel, according to one or more uplink transmission parameters, the one or more uplink transmission parameters based at least in part on the sounding reference signal resource indicator field in the received downlink control information message, the value of a control resource set pool index associated with the control resource set, and the determined transmission configuration indicator state.

19. The apparatus of claim 18, wherein the instructions are further executable by the one or more processors to cause the apparatus to:

determine a sounding reference signal resource set from at least two sounding reference signal resource sets to use for the uplink shared channel, the sounding reference signal resource set is determined based at least in part on the value of the control resource set pool index.

20. The apparatus of claim 19, wherein the instructions are further executable by the one or more processors to cause the apparatus to:
receive, via the higher layer signaling, a configuration comprising a first association between a first value of the control resource set pool index and a first sounding reference signal resource set and a second association between a second value of the control resource set pool index and a second sounding reference signal resource set, wherein determining the sounding reference signal resource set from the at least two sounding reference signal resource sets comprises:
determine that the sounding reference signal resource set corresponds to the first sounding reference signal resource set based at least in part on the first value of the control resource set pool index or to the second sounding reference signal resource set based at least in part on the second value of the control resource set pool index.

21. The apparatus of claim 20, wherein the instructions are further executable by the one or more processors to cause the apparatus to:
determine that one or both of the first sounding reference signal resource set and the second sounding reference signal resource set correspond to a codebook-based usage.

22. The apparatus of claim 20, wherein the instructions are further executable by the one or more processors to cause the apparatus to:
determine that one or both of the first sounding reference signal resource set and the second sounding reference signal resource set correspond to a noncodebook-based usage.

23. The apparatus of claim 18, wherein the instructions are further executable by the one or more processors to cause the apparatus to:
identify one or more sounding reference signal resources based at least in part on the sounding reference signal resource indicator field in the received downlink control information message.

24. The apparatus of claim 23, wherein the sounding reference signal resource indicator field indicates that the one or more sounding reference signal resources correspond to a first sounding reference signal resource set based at least in part on the value of the control resource set pool index.

25. The apparatus of claim 23, wherein the sounding reference signal resource indicator field indicates that the one or more sounding reference signal resources correspond to a second sounding reference signal resource set based at least in part on the value of the control resource set pool index.

26. The apparatus of claim 23, wherein the instructions are further executable by the one or more processors to cause the apparatus to:
determine the one or more uplink transmission parameters based at least in part on the one or more sounding reference signal resources, wherein the one or more uplink transmission parameters comprises a directional beam for the uplink shared channel, a precoding for the uplink shared channel, a rank for the uplink shared channel, or a power control parameter of the uplink shared channel.

27. The apparatus of claim 18, wherein the instructions are further executable by the one or more processors to cause the apparatus to:
identify the transmission configuration indicator state to use for the uplink shared channel based at least in part on a transmission configuration indicator field in the received downlink control information message, wherein:
the transmission configuration indicator field indicates that the transmission configuration indicator state corresponds to a first set of transmission configuration indicator states based at least in part on the value of the control resource set pool index; or
the transmission configuration indicator field indicates that the transmission configuration indicator state corresponds to a second set of transmission configuration indicator states based at least in part on the value of the control resource set pool index.

28. An apparatus for wireless communications at a user equipment (UE), comprising:
means for receiving, via higher layer signaling, a configuration comprising a first association between a first value of a control resource set pool index and a first set of transmission configuration indicator states for an uplink shared channel and a second association between a second value of the control resource set pool index and a second set of transmission configuration indicator states for the uplink shared channel;
means for receiving, in a control resource set, a downlink control information message scheduling the uplink shared channel, the received downlink control information message including a sounding reference signal resource indicator field;
means for determining a transmission configuration indicator state to use for the uplink shared channel based at least in part on a value of the control resource set pool index for the control resource set; and
means for transmitting, on the uplink shared channel, according to one or more uplink transmission parameters, the one or more uplink transmission parameters based at least in part on the sounding reference signal resource indicator field in the received downlink control information message, the value of a control resource set pool index associated with the control resource set, and the determined transmission configuration indicator state.

29. The apparatus of claim 28, further comprising:
means for identifying the transmission configuration indicator state to use for the uplink shared channel based at least in part on a transmission configuration indicator field in the received downlink control information message, wherein:
the transmission configuration indicator field indicates that the transmission configuration indicator state corresponds to a first set of transmission configuration indicator states based at least in part on the value of the control resource set pool index; or
the transmission configuration indicator field indicates that the transmission configuration indicator state corresponds to a second set of transmission configuration indicator states based at least in part on the value of the control resource set pool index.

30. A non-transitory computer-readable medium storing code for wireless communications at a user equipment (UE), the code comprising instructions executable by one or more processors to:

receive, via higher layer signaling, a configuration comprising a first association between a first value of a control resource set pool index and a first set of transmission configuration indicator states for an uplink shared channel and a second association between a second value of the control resource set pool index and a second set of transmission configuration indicator states for the uplink shared channel;

receive, in a control resource set, a downlink control information message scheduling the uplink shared channel, the received downlink control information message including a sounding reference signal resource indicator field;

determine a transmission configuration indicator state to use for the uplink shared channel based at least in part on a value of the control resource set pool index for the control resource set; and transmit, on the uplink shared channel, according to one or more uplink transmission parameters, the one or more uplink transmission parameters based at least in part on the sounding reference signal resource indicator field in the received downlink control information message, the value of a control resource set pool index associated with the control resource set, and the determined transmission configuration indicator state.

31. The non-transitory computer-readable medium of claim 30, the code further comprising instructions executable by the one or more processors to:

identify the transmission configuration indicator state to use for the uplink shared channel based at least in part on a transmission configuration indicator field in the received downlink control information message, wherein:

the transmission configuration indicator field indicates that the transmission configuration indicator state corresponds to a first set of transmission configuration indicator states based at least in part on the value of the control resource set pool index; or the transmission configuration indicator field indicates that the transmission configuration indicator state corresponds to a second set of transmission configuration indicator states based at least in part on the value of the control resource set pool index.

\* \* \* \* \*